US012395986B2

(12) United States Patent
Marinier et al.

(10) Patent No.: US 12,395,986 B2
(45) Date of Patent: *Aug. 19, 2025

(54) METHOD AND APPARATUS FOR TRANSMITTING DATA AND CONTROL INFORMATION ON MULTIPLE UPLINK CARRIER FREQUENCIES

(71) Applicant: InterDigital Patent Holdings, Inc., Wilmington, DE (US)

(72) Inventors: Paul Marinier, Brossard (CA); Diana Pani, Montreal (CA); Christopher R. Cave, Dollard-des-Ormeaux (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,748

(22) Filed: Jun. 28, 2021

(65) Prior Publication Data

US 2021/0329616 A1    Oct. 21, 2021

Related U.S. Application Data

(63) Continuation of application No. 16/667,835, filed on Oct. 29, 2019, now Pat. No. 11,051,280, which is a
(Continued)

(51) Int. Cl.
*H04W 72/20* (2023.01)
*H04L 5/00* (2006.01)
(Continued)

(52) U.S. Cl.
CPC .............. *H04W 72/20* (2023.01); *H04L 5/00* (2013.01); *H04L 5/001* (2013.01); *H04L 5/0044* (2013.01);
(Continued)

(58) Field of Classification Search
CPC .. H04W 72/20; H04W 72/0446; H04W 72/04
(Continued)

(56) References Cited

U.S. PATENT DOCUMENTS 4,817,192 A * 3/1989 Phillips .................... H04B 1/66
455/75
4,852,086 A * 7/1989 Eastmond ................ H04B 1/68
375/216
(Continued)

FOREIGN PATENT DOCUMENTS

CN     1247682 A     3/2000
CN     1605220 A     4/2005
(Continued)

OTHER PUBLICATIONS

A. Ijaz, L. Zhang, A. u. Quddus and R. Tafazolli, "HARQ in Relay-Assisted Transmission for Machine Type Communications," in IEEE Wireless Communications Letters, vol. 5, No. 2, pp. 172-175, Apr. 2016, doi: 10.1109/LWC.2016.2514423. (Year: 2016).*
(Continued)

*Primary Examiner* — William D Cumming
(74) *Attorney, Agent, or Firm* — Condo Roccia Koptiw LLP

(57) ABSTRACT

A method and an apparatus for wireless transmission using multiple uplink carriers are disclosed. A wireless transmit/receive unit (WTRU) may transmit via a primary uplink carrier data, pilot and control channels for uplink transmissions on both uplink carriers, and transmit a data channel and a pilot channel via a secondary uplink carrier. Alternatively, the WTRU may transmit via a primary uplink carrier data, pilot, and control channels for uplink transmission on the primary uplink carrier, and transmit via a secondary uplink carrier data, pilot, and control channels for uplink transmissions on the secondary uplink carrier. Each uplink carrier may be associated with at least one specific downlink
(Continued)

carrier such that the WTRU applies control information received on a downlink carrier to uplink transmissions on an uplink carrier associated with the downlink carrier on which the WTRU receives the control information.

14 Claims, 12 Drawing Sheets

Related U.S. Application Data continuation of application No. 16/016,095, filed on Jun. 22, 2018, now Pat. No. 10,477,522, which is a continuation of application No. 13/630,360, filed on Sep. 28, 2012, now Pat. No. 10,039,085, which is a continuation of application No. 12/610,294, filed on Oct. 31, 2009, now Pat. No. 8,295,779.

(60) Provisional application No. 61/148,690, filed on Jan. 30, 2009, provisional application No. 61/141,638, filed on Dec. 30, 2008, provisional application No. 61/117,851, filed on Nov. 25, 2008, provisional application No. 61/117,494, filed on Nov. 24, 2008, provisional application No. 61/109,978, filed on Oct. 31, 2008.

(51) Int. Cl.
*H04W 28/06* (2009.01)
*H04W 52/32* (2009.01)
*H04W 52/36* (2009.01)
*H04W 72/00* (2023.01)

(52) U.S. Cl.
CPC ......... *H04L 5/0053* (2013.01); *H04W 52/365* (2013.01); *H04W 72/00* (2013.01); *H04L 5/0055* (2013.01); *H04W 28/06* (2013.01); *H04W 52/325* (2013.01)

(58) Field of Classification Search
USPC ...... 455/45, 79, 75, 230, 515; 370/295, 329, 370/335, 430, 480, 525, 349; 375/261, 375/295, 316, 321
See application file for complete search history.

(56) References Cited

U.S. PATENT DOCUMENTS

| | | | |
|---|---|---|---|
| 4,955,083 A * | 9/1990 | Phillips | H04B 1/66 375/321 |
| 5,109,531 A * | 4/1992 | Heck | H03J 7/065 455/203 |
| 5,455,960 A | 10/1995 | Pelchat et al. | |
| 5,689,440 A * | 11/1997 | Leitch | G10L 19/00 370/206 |
| 5,796,726 A | 8/1998 | Hassan et al. | |
| 5,838,799 A * | 11/1998 | Cioffi | H04L 27/2602 370/525 |
| 6,597,911 B1 | 7/2003 | Kransmo et al. | |
| 6,965,650 B2 * | 11/2005 | Akiyama | H04L 27/3455 375/261 |
| 7,013,143 B2 | 3/2006 | Love et al. | |
| 7,299,048 B2 | 11/2007 | Lim et al. | |
| 7,389,112 B2 | 6/2008 | Nilsson et al. | |
| 7,599,698 B2 | 10/2009 | Cheng et al. | |
| 7,961,700 B2 | 6/2011 | Malladi et al. | |
| 8,019,287 B2 | 9/2011 | Harrison et al. | |
| 8,144,667 B2 | 3/2012 | Dominique et al. | |
| 8,169,953 B2 | 5/2012 | Damnjanovic et al. | |
| 8,295,779 B2 | 10/2012 | Cave et al. | |
| 8,358,668 B2 * | 1/2013 | Zhang | H04L 27/14 370/371 |
| 8,385,959 B2 * | 2/2013 | Lee | H04W 36/0011 370/335 |
| 8,391,910 B2 | 3/2013 | Heo et al. | |
| 8,457,066 B2 | 6/2013 | Cave et al. | |
| 8,457,091 B2 * | 6/2013 | Pani | H04W 72/20 370/335 |
| 8,514,820 B2 | 8/2013 | Cai et al. | |
| 8,553,648 B2 * | 10/2013 | Lee | H04L 5/0096 455/438 |
| 8,576,788 B2 * | 11/2013 | Lee | H04L 5/0078 455/450 |
| 8,620,334 B2 | 12/2013 | Terry et al. | |
| 8,718,658 B2 | 5/2014 | Choi et al. | |
| 8,724,570 B2 * | 5/2014 | Lee | H04L 5/0053 455/450 |
| 8,774,123 B1 | 7/2014 | Baldemair et al. | |
| 8,797,967 B2 | 8/2014 | Cheng et al. | |
| 8,804,812 B2 * | 8/2014 | Seo | H04L 1/1861 375/240 |
| 8,837,519 B2 | 9/2014 | Marco et al. | |
| 8,868,088 B2 | 10/2014 | Cheng et al. | |
| 9,002,392 B2 * | 4/2015 | Lee | H04L 5/0094 455/450 |
| 9,048,784 B2 | 6/2015 | Chesnutt et al. | |
| 9,191,939 B2 | 11/2015 | Liang et al. | |
| 9,203,587 B2 | 12/2015 | Guan et al. | |
| 9,226,202 B2 | 12/2015 | Zeira et al. | |
| 9,264,943 B2 | 2/2016 | Terry et al. | |
| 9,277,546 B2 | 3/2016 | Baldemair et al. | |
| 9,332,537 B2 | 5/2016 | Cheng | |
| 9,356,765 B2 | 5/2016 | Wang et al. | |
| 9,391,746 B2 | 7/2016 | Lee et al. | |
| 9,445,428 B2 | 9/2016 | Baldemair et al. | |
| 9,571,253 B2 | 2/2017 | Guan et al. | |
| 9,596,599 B2 | 3/2017 | Xiao et al. | |
| 9,655,118 B2 | 5/2017 | Kang et al. | |
| 9,713,125 B2 * | 7/2017 | Pani | H04L 1/1854 |
| 9,743,360 B2 | 8/2017 | Baldemair et al. | |
| 9,867,136 B2 | 1/2018 | Cheng | |
| 10,178,632 B2 | 1/2019 | Loehr et al. | |
| 10,225,050 B2 | 3/2019 | Guan et al. | |
| 10,225,062 B2 | 3/2019 | Guan et al. | |
| 10,404,417 B2 | 9/2019 | Feng et al. | |
| 10,477,522 B2 | 11/2019 | Marinier et al. | |
| 10,491,340 B2 | 11/2019 | Guan et al. | |
| 11,051,280 B2 * | 6/2021 | Marinier | H04L 5/0044 |
| 11,134,477 B2 | 9/2021 | Terry et al. | |
| 11,476,980 B2 * | 10/2022 | Lei | H04L 1/1861 |
| 11,751,199 B2 | 9/2023 | Terry et al. | |
| 2001/0053136 A1 * | 12/2001 | Sjoberg | H04L 5/023 370/430 |
| 2001/0055345 A1 * | 12/2001 | Akiyama | H04L 27/3455 375/295 |
| 2003/0148765 A1 | 8/2003 | Ma et al. | |
| 2004/0057407 A1 | 3/2004 | Balachandran et al. | |
| 2004/0106430 A1 | 6/2004 | Schwarz et al. | |
| 2004/0179493 A1 | 9/2004 | Khan | |
| 2005/0068990 A1 | 3/2005 | Liu | |
| 2005/0128993 A1 | 6/2005 | Yu et al. | |
| 2005/0176440 A1 | 8/2005 | Sang et al. | |
| 2005/0277419 A1 | 12/2005 | Takano et al. | |
| 2006/0007889 A1 | 1/2006 | Khan | |
| 2006/0111050 A1 | 5/2006 | Choi et al. | |
| 2006/0199577 A1 | 9/2006 | Ramakrishna et al. | |
| 2006/0221883 A1 | 10/2006 | Damnjanovic et al. | |
| 2006/0268720 A1 | 11/2006 | Rong et al. | |
| 2006/0274712 A1 | 12/2006 | Malladi et al. | |
| 2006/0280142 A1 | 12/2006 | Damnjanovic et al. | |
| 2007/0047502 A1 | 3/2007 | Marinier et al. | |
| 2007/0073895 A1 | 3/2007 | Sebire et al. | |
| 2007/0109964 A1 | 5/2007 | Kwak et al. | |
| 2007/0133458 A1 | 6/2007 | Chandra et al. | |
| 2007/0177555 A1 | 8/2007 | Brueck et al. | |
| 2007/0183380 A1 | 8/2007 | Rensburg et al. | |
| 2007/0183432 A1 | 8/2007 | Wang et al. | |
| 2007/0245201 A1 | 10/2007 | Sammour et al. | |
| 2007/0258402 A1 | 11/2007 | Nakamata et al. | |
| 2008/0043867 A1 | 2/2008 | Blanz et al. | |

(56) References Cited

U.S. PATENT DOCUMENTS

| | | |
|---|---|---|
| 2008/0049669 A1 | 2/2008 | Lundby et al. |
| 2008/0101307 A1 | 5/2008 | Sindhushayana et al. |
| 2008/0123595 A1 | 5/2008 | Lindheimer et al. |
| 2008/0123601 A1 | 5/2008 | Malladi et al. |
| 2008/0151985 A1 | 6/2008 | Chin et al. |
| 2008/0161003 A1 | 7/2008 | Brueck et al. |
| 2008/0212615 A1 | 9/2008 | Ranta-Aho et al. |
| 2008/0253318 A1 | 10/2008 | Malladi et al. |
| 2008/0253336 A1 | 10/2008 | Parkvall et al. |
| 2008/0268785 A1 | 10/2008 | Mccoy et al. |
| 2008/0285477 A1 | 11/2008 | Kuroda et al. |
| 2009/0147869 A1 | 6/2009 | Duan et al. |
| 2009/0201885 A1 | 8/2009 | Kuroda et al. |
| 2009/0245212 A1 | 10/2009 | Sambhwani et al. |
| 2009/0252104 A1* | 10/2009 | Zhang ............... H04L 5/0092 370/328 |
| 2009/0253458 A1 | 10/2009 | Dillinger et al. |
| 2009/0310538 A1 | 12/2009 | Lee et al. |
| 2010/0002800 A1 | 1/2010 | Kim et al. |
| 2010/0040002 A1 | 2/2010 | Lee et al. |
| 2010/0040005 A1 | 2/2010 | Kim et al. |
| 2010/0113004 A1 | 5/2010 | Cave et al. |
| 2010/0113078 A1 | 5/2010 | Farajidana et al. |
| 2010/0118817 A1 | 5/2010 | Damnjanovic et al. |
| 2010/0130219 A1 | 5/2010 | Cave et al. |
| 2010/0142477 A1 | 6/2010 | Yokota |
| 2010/0172428 A1 | 7/2010 | Pani et al. |
| 2010/0232382 A1 | 9/2010 | Gauvreau et al. |
| 2010/0246562 A1 | 9/2010 | Yamada et al. |
| 2010/0265840 A1 | 10/2010 | Catreux-Erceg et al. |
| 2011/0026475 A1* | 2/2011 | Lee ............... H04L 5/0096 370/349 |
| 2011/0026495 A1* | 2/2011 | Lee ............... H04L 5/0042 370/335 |
| 2011/0039593 A1* | 2/2011 | Lee ............... H04W 72/04 455/515 |
| 2011/0103323 A1 | 5/2011 | Wang et al. |
| 2011/0116467 A1 | 5/2011 | Jung et al. |
| 2011/0116530 A1 | 5/2011 | Sambhwani |
| 2011/0141928 A1 | 6/2011 | Shin et al. |
| 2011/0170508 A1 | 7/2011 | Xue et al. |
| 2011/0216677 A1 | 9/2011 | Ahmadi et al. |
| 2011/0228731 A1 | 9/2011 | Luo et al. |
| 2011/0261679 A1* | 10/2011 | Li ............... H04L 5/0053 370/216 |
| 2011/0305290 A1 | 12/2011 | Kim et al. |
| 2012/0093103 A1* | 4/2012 | Lee ............... H04L 5/0053 370/329 |
| 2012/0135762 A1 | 5/2012 | Cheng et al. |
| 2012/0207123 A1* | 8/2012 | Seo ............... H04W 72/21 370/329 |
| 2012/0314679 A1 | 12/2012 | Lee et al. |
| 2013/0051264 A1 | 2/2013 | Wang et al. |
| 2013/0072208 A1 | 3/2013 | Marinier et al. |
| 2013/0114764 A1* | 5/2013 | Zhang ............... H04L 27/0008 375/340 |
| 2013/0148603 A1* | 6/2013 | Lee ............... H04L 5/0055 370/329 |
| 2013/0170407 A1 | 7/2013 | Liang et al. |
| 2013/0178221 A1 | 7/2013 | Jung et al. |
| 2013/0235829 A1* | 9/2013 | Pani ............... H04L 1/0027 370/329 |
| 2013/0336254 A1 | 12/2013 | Suzuki et al. |
| 2014/0044092 A1 | 2/2014 | Guan et al. |
| 2014/0071946 A1 | 3/2014 | Terry et al. |
| 2014/0173682 A1 | 6/2014 | Xiao et al. |
| 2014/0293927 A1 | 10/2014 | Chun et al. |
| 2014/0321395 A1 | 10/2014 | Baldemair et al. |
| 2015/0319753 A1 | 11/2015 | Chen et al. |
| 2016/0020879 A1 | 1/2016 | Shimezawa et al. |
| 2016/0050059 A1 | 2/2016 | Guan et al. |
| 2016/0080132 A1 | 3/2016 | Cave et al. |
| 2016/0174249 A1 | 6/2016 | Baldemair et al. |
| 2016/0242193 A1 | 8/2016 | Hong et al. |
| 2016/0248545 A1 | 8/2016 | Cheng |
| 2016/0330698 A1 | 11/2016 | Loehr et al. |
| 2016/0381642 A1 | 12/2016 | Baldemair et al. |
| 2017/0111156 A1 | 4/2017 | Guan et al. |
| 2017/0188235 A1 | 6/2017 | Xiao et al. |
| 2017/0280433 A1* | 9/2017 | Pani ............... H04L 1/1854 |
| 2017/0331596 A1 | 11/2017 | Guan et al. |
| 2018/0062796 A1 | 3/2018 | Feng et al. |
| 2018/0131497 A1 | 5/2018 | Cave et al. |
| 2018/0132265 A1 | 5/2018 | Guan et al. |
| 2018/0302890 A1 | 10/2018 | Marinier et al. |
| 2019/0149277 A1 | 5/2019 | Guan et al. |
| 2020/0344010 A1* | 10/2020 | Lei ............... H04W 72/0446 |
| 2021/0329616 A1* | 10/2021 | Marinier ............... H04W 72/20 |
| 2023/0362933 A1 | 11/2023 | Terry et al. |

FOREIGN PATENT DOCUMENTS

| | | |
|---|---|---|
| CN | 1647567 A | 7/2005 |
| CN | 1663300 A | 8/2005 |
| CN | 1719940 A | 1/2006 |
| CN | 1902970 A | 1/2007 |
| CN | 1973461 A | 5/2007 |
| CN | 101005343 A | 7/2007 |
| CN | 101026429 A | 8/2007 |
| CN | 101043290 A | 9/2007 |
| CN | 101047469 A | 10/2007 |
| CN | 101047488 A | 10/2007 |
| CN | 101056152 A | 10/2007 |
| CN | 101106689 A * | 1/2008 |
| CN | 101175304 A | 5/2008 |
| CN | 101185277 A | 5/2008 |
| CN | 101185278 A | 5/2008 |
| CN | 101204050 A | 6/2008 |
| CN | 101268709 A | 9/2008 |
| CN | 101282197 A | 10/2008 |
| CN | 101291162 A | 10/2008 |
| CN | 102349259 B | 12/2016 |
| EP | 1502451 A1 | 2/2005 |
| EP | 2675231 A2 | 12/2013 |
| JP | 2005-512430 A | 4/2005 |
| JP | 2005-223671 A | 8/2005 |
| JP | 2006-025438 A | 1/2006 |
| JP | 2006-270788 A | 10/2006 |
| JP | 2007-235976 A | 9/2007 |
| JP | 2008-182734 A | 8/2008 |
| JP | 2008-187377 A | 8/2008 |
| JP | 2008-530896 A | 8/2008 |
| JP | 2008-538061 A | 10/2008 |
| JP | 2008-539667 A | 11/2008 |
| JP | 2008-546255 A | 12/2008 |
| JP | 2009-508368 A | 2/2009 |
| JP | 2009-512321 A | 3/2009 |
| JP | 2012-514440 A | 6/2012 |
| JP | 2012-520616 A | 9/2012 |
| JP | 2014-207696 A | 10/2014 |
| KR | 10-2003-0007481 A | 1/2003 |
| KR | 10-2006-0057059 A | 5/2006 |
| KR | 10-0675489 B1 | 1/2007 |
| KR | 10-2007-0114623 A | 12/2007 |
| KR | 10-2008-0016652 A | 2/2008 |
| TW | 200708018 A | 2/2007 |
| TW | 200805924 A | 1/2008 |
| TW | 200832966 A | 8/2008 |
| TW | 200908633 A | 2/2009 |
| WO | 98/35525 A2 | 8/1998 |
| WO | 01/76110 A2 | 10/2001 |
| WO | 03/094541 A1 | 11/2003 |
| WO | 2005/125040 A2 | 12/2005 |
| WO | 2006/043712 A1 | 4/2006 |
| WO | 2006/088301 A1 | 8/2006 |
| WO | 2006/120524 A1 | 11/2006 |
| WO | 2006/125149 A2 | 11/2006 |
| WO | 2007/013942 A2 | 2/2007 |
| WO | 2007/023787 A1 | 3/2007 |
| WO | 2007/136002 A1 | 11/2007 |
| WO | 2007/123375 A8 | 12/2007 |
| WO | 2008/021573 A2 | 2/2008 |
| WO | 2008/024889 A2 | 2/2008 |

(56) References Cited

FOREIGN PATENT DOCUMENTS

| WO | 2008/054775 | A2 | | 5/2008 | | |
|---|---|---|---|---|---|---|
| WO | 2009/117673 | A1 | | 9/2009 | | |
| WO | 2009/120797 | A1 | | 10/2009 | | |
| WO | 2010/078425 | A1 | | 7/2010 | | |
| WO | WO-2011052949 | A2 | * | 5/2011 | ............ | H04L 1/1861 |
| WO | WO-2012041101 | A1 | * | 4/2012 | ............... | H04L 1/06 |

OTHER PUBLICATIONS

3rd Generation Partnership Project (3GPP), "E-TFC Selection for DC-HSUPA", InterDigital, 3GPP TSG-RAN WG2, Conference Call, Aug. 11, 2009, 5 pages.
3rd Generation Partnership Project (3GPP), R1-080356, "Notion of Anchor Carrier in LTE-A", Qualcomm Europe, 3GPP TSG RAN WG1 #55bis, Ljubljana, Slovenia, Jan. 12-16, 2009, pp. 1-5.
3rd Generation Partnership Project (3GPP), R1-082448, "Carrier Aggregation in Advanced E-UTRA", Huawei, 3GPP TSG RAN WG1#53bis, Warsaw, Poland, Jun. 30-Jul. 4, 2008, 4 pages.
3rd Generation Partnership Project (3GPP), R1-082468, "Carrier Aggregation in LTE-Advanced", Ericsson, TSG-RAN WG1 #53bis, Warsaw, Poland, Jun. 30-Jul. 4, 2008, 6 pages.
3rd Generation Partnership Project (3GPP), R1-082848, "General Control Channel Design for LTE-A", ZTE, 3GPP TSG-RAN WG1 #54, Jeju, Korea, Aug. 18-22, 2008, 3 pages.
3rd Generation Partnership Project (3GPP), R1-084194, "Proposals and Issues on the Carrier Aggregation and Control Signaling for LTE-A", LG Electronics, 3GPP TSG RAN WG1 #55, Prague, Czech, Nov. 10-14, 2008, 6 pages.
3rd Generation Partnership Project (3GPP), R1-090126, "PUCCH Design for Carrier Aggregation", Huawei, 3GPP TSG RAN WG1#55bis, Ljubljana, Slovenia, Jan. 12-16, 2009, 6 pages.
3rd Generation Partnership Project (3GPP), R1-090268, "Control Channel Design Issues for Carrier Aggregation in LTE-A", Motorola, 3GPP TSG RAN1#55bis, Ljubljana, Slovenia, Jan. 12-16, 2009, 3 pages.
3rd Generation Partnership Project (3GPP), R1-090584, "Downlink and Uplink Control to Support Carrier Aggregation", Texas Instruments, 3GPP TSG RAN WG1 #56, Athens, Greece, Feb. 9-13, 2009, pp. 1-5.
3rd Generation Partnership Project (3GPP), R1-090629, "Uplink Control Channel Design for LTE-Advanced", ZTE, 3GPP TSG RAN WG1 Meeting #56, Athens, Greece, Feb. 9-13, 2009, pp. 1-5.
3rd Generation Partnership Project (3GPP), R1-090646, "On Component Carrier Types and Support For LTE-A Features", NEC Group, 3GPP TSG-RAN WG1 Meeting #56, Feb. 9-13, 2009, 4 pages.
3rd Generation Partnership Project (3GPP), R1-090735, "Primary Component Carrier Selection, Monitoring, and Recovery", Nokia Siemens Networks, Nokia, 3GPP TSG RAN WG1 #56 Meeting, Athens, Greece, Feb. 9-13, 2009, 6 pages.
3rd Generation Partnership Project (3GPP), R1-090813, "PUCCH Design for Carrier Aggregation", Huawei, 3GPP TSG RAN WG1 Meeting #56, Athens, Greece, Feb. 9-13, 2009, 6 pages.
3rd Generation Partnership Project (3GPP), R1-090814, "Component Carrier Structures", Huawei, 3GPP TSG RAN WG1 Meeting #56, Athens, Greece, Feb. 9-13, 2009, 3 pages.
3rd Generation Partnership Project (3GPP), R1-090860, "Notion of Anchor Carrier in LTE-A", Qualcomm Europe, 3GPP TSG RAN WG1 #56, Athens, Greece, Feb. 9-13, 2009, pp. 1-5.
3rd Generation Partnership Project (3GPP), R1-090939, "UL Control Channel Scheme for LTE-A", CATT, RITT, 3GPP TSG RAN WG1 Meeting #56, Athens, Greece, Feb. 9-13, 2009, 6 pages.
3rd Generation Partnership Project (3GPP), R1-090952, "Anchor Component Carrier and Preferred Control Signal Structure", Fujitsu, 3GPP TSG-RAN1 #56, Athens, Greece, Jan. 9-13, 2009, pp. 1-5.
3rd Generation Partnership Project (3GPP), R1-092762, "DC-HSUPA-E-TFC Selection System Simulation Results", Ericsson, ST-Ericsson, 3GPP TSG RAN WG1 Meeting #57bis, Los Angeles, CA, USA, Jun. 29-Jul. 3, 2009, 9 pages.

3rd Generation Partnership Project (3GPP), R2-054557, "Report of RAN2 Conference Call on E-TFC Selection Algorithm for DCHSUPA", RAN2 Vice-Chairman [Rapporteur], 3GPP TSG-RAN WG2 Meeting #67, Shenzhen, P.R. of China, Aug. 24-28, 2009, pp. 1-2.
3rd Generation Partnership Project (3GPP), R2-062912, "Uplink Resource Allocation Scheme (Dynamic Scheduling)", NTT DoCoMo, Inc., 3GPP TSG RAN WG2 #55, Seoul, Korea, Oct. 9-13, 2006, 3 pages.
3rd Generation Partnership Project (3GPP), R2-085128, "Happy Bit Setting with Improved L2 for UL", InterDigital, Nokia Corporation, Nokia Siemens Networks, Ericsson, Alcatel-Lucent, 3GPP TSG-WG2 Meeting #63bis, Prague, Czech Republic, Sep. 29-Oct. 3, 2008, 2 pages.
3rd Generation Partnership Project (3GPP), R2-093920, "[66#9] LTE-UMTS: Inbound Mobility to CSG Cell from LTE Cell", Email Discussion Rapporteur (Motorola), 3GPP TSG-RAN WG2#66bis, Los Angeles, U.S.A., Jun. 29-Jul. 3, 2009, pp. 1-29.
3rd Generation Partnership Project (3GPP), R2-094087, "Report of 3GPP TSG RAN WG2 Meeting #66, San Francisco, USA, May 4-8, 2009", ETSI MCC, 3GPP TSG RAN WG2 Meeting #66bis, Los Angeles, USA, Jun. 29-Jul. 3, 2009, pp. 1-151.
3rd Generation Partnership Project (3GPP), R2-094372, "On Usage of Happy Bits in Dual Carrier HSUPA", Nokia Siemens Networks, 3GPP TSG-RAN WG2 Meeting #67, Shenzhen, China, Aug. 24-28, 2009, 5 pages.
3rd Generation Partnership Project (3GPP), R2-094383, "Happy Bit for DC-HSUPA", Ericsson, ST-Ericsson, 3GPP TSG RAN WG2 #67, Shenzhen, China, Aug. 24-28, 2009, pp. 1-3.
3rd Generation Partnership Project (3GPP), R2-094385, "Scheduling Information for DC-HSUPA", Ericsson, ST-Ericsson, 3GPP TSG RAN WG2 #67, Shenzhen, China, Aug. 24-28, 2009, pp. 1-3.
3rd Generation Partnership Project (3GPP), R2-094452, "Triggering and Reporting of SI and Happy Bit in DC-HSUPA", Qualcomm Europe, 3GPP TSG-RAN WG2 #67, Shenzhen, P.R. China, Aug. 24-28, 2009, pp. 1-3.
3rd Generation Partnership Project (3GPP), R2-094541, "SI Report for DC-HSUPA", Huawei, 3GPP TSG RAN WG2 Meeting #67, Shenzhen, China, Aug. 24-28, 2009, 4 pages.
3rd Generation Partnership Project (3GPP), R2-094542, "Happy Bit for DC-HSUPA", Huawei, 3GPP TSG RAN WG2 Meeting #67, Shenzhen, China, Aug. 24-28, 2009, pp. 1-4.
3rd Generation Partnership Project (3GPP), R2-094795, "On the Usage of the Happy Bits for DC-HSUPA", InterDigital, 3GPP TSG-RAN WG2 Meeting #67, Shenzhen, China, Aug. 24-28, 2009, 3 pages.
3rd Generation Partnership Project (3GPP), R2-095663, "Happy Bits Usage for DC-HSUPA", InterDigital, 3GPP TSG-RAN WG2 Meeting #67bis, Miyazaki, Japan, Oct. 12-16, 2009, 4 pages.
3rd Generation Partnership Project (3GPP), R2-095716, "Definition for the Happy Bit", Ericsson, ST-Ericsson, 3GPP TSG RAN WG2 #67bis, Miyazaki, Japan, Oct. 12-16, 2009, pp. 1-7.
3rd Generation Partnership Project (3GPP), R2-09XXXX, "E-TFC Selection in DC-HSUPA", Qualcomm Europe, 3GPP TSG-RAN WG2 #67, Shenzhen, P.R. China, Mar. 24-Aug. 28, 2009, pp. 1-7.
3rd Generation Partnership Project (3GPP), R2-09XXXX, "On Greedy Filling Power Allocation in E-TFC Selection for DC-HSUPA", Alcatel-Lucent, 3GPP TSG-RAN WG2 Meeting #67, Shenzhen, China, Aug. 24- 28, 2009, 6 pages.
3rd Generation Partnership Project (3GPP), RP-080490, "Dual-Cell HSDPA Operation on Adjacent Carriers", 3GPP TSG RAN #40, Prague, Czech Republic, May 27-30, 2008, 4 pages.
3rd Generation Partnership Project (3GPP), RP-090351, "Support of Home NB and Home eNB Enhancements RAN2 Aspects", Huawei, Alcatel-Lucent, TSG-RAN Meeting #43, Biarritz, France, Mar. 3-6, 2009, 5 pages.
3rd Generation Partnership Project (3GPP), TR 36.913 V8.0.0, "Technical Specification Group Radio Access Network, Requirements for Further Advancements for E-UTRA (LTE-Advanced) (Release 8)", Jun. 2008, pp. 1-14.
3rd Generation Partnership Project (3GPP), TR 36.913 V8.0.1, "Technical Specification Group Radio Access Network, Require-

(56) References Cited

OTHER PUBLICATIONS ments for Further Advancements for Evolved Universal Terrestrial Radio Access (E-UTRA) (LTE-Advanced) (Release 8)", Mar. 2009, pp. 1-15.

3rd Generation Partnership Project (3GPP), TR 36.913 V9.0.0, "Technical Specification Group Radio Access Network, Requirements for further advancements for Evolved Universal Terrestrial Radio Access (E-UTRA) (LTE-Advanced) (Release 9)", Dec. 2009, pp. 1-15.

3rd Generation Partnership Project (3GPP), TS 25.133 V8.4.0, "Technical Specification Group Radio Access Network, Requirements for Support of Radio Resource Management (FDD) (Release 8)", Sep. 2008, pp. 1-198.

3rd Generation Partnership Project (3GPP), TS 25.133 V8.8.0, "Technical Specification Group Radio Access Network, Requirements for Support of Radio Resource Management (FDD) (Release 8)", Sep. 2009, pp. 1-235.

3rd Generation Partnership Project (3GPP), TS 25.133 V9.1.0, "Technical Specification Group Radio Access Network, Requirements for Support of Radio Resource Management (FDD) (Release 9)", Sep. 2009, pp. 1-236.

3rd Generation Partnership Project (3GPP), TS 25.214 V8.3.0, "Technical Specification Group Radio Access Network, Physical Layer Procedures (FDD) (Release 8)", Sep. 2008, pp. 1-89.

3rd Generation Partnership Project (3GPP), TS 25.214 V8.7.0, "Technical Specification Group Radio Access Network, Physical Layer Procedures (FDD) (Release 8)", Sep. 2009, pp. 1-93.

3rd Generation Partnership Project (3GPP), TS 25.214 V9.0.0, "Technical Specification Group Radio Access Network, Physical Layer Procedures (FDD) (Release 9)", Sep. 2009, pp. 1-95.

3rd Generation Partnership Project (3GPP), TS 25.308 V8.3.0, "Technical Specification Group Radio Access Network, High Speed Downlink Packet Access (HSDPA), Overall Description, Stage 2 (Release 8)", Sep. 2008, pp. 1-56.

3rd Generation Partnership Project (3GPP), TS 25.308 V8.7.0, "Technical Specification Group Radio Access Network, High Speed Downlink Packet Access (HSDPA), Overall Description, Stage 2 (Release 8)", Sep. 2009, pp. 1-65.

3rd Generation Partnership Project (3GPP), TS 25.308 V9.1.0, "Technical Specification Group Radio Access Network High Speed Downlink Packet Access (HSDPA), Overall Description, Stage 2 (Release 9)", Sep. 2009, pp. 1-65.

3rd Generation Partnership Project (3GPP), TS 25.321 V8.3.0, "Technical Specification Group Access Network, Medium Access Control (MAC) Protocol Specification, (Release 7)", Sep. 2008, pp. 1-167.

3rd Generation Partnership Project (3GPP), TS 25.321 V8.7.0, "Technical Specification Group Radio Access Network, Medium Access Control (MAC) Protocol Specification (Release 8)", Sep. 2009, pp. 1-187.

3rd Generation Partnership Project (3GPP), TS 25.321 V9.0.0, "Technical Specification Group Radio Access Network, Medium Access Control (MAC) Protocol Specification (Release 9)", Sep. 2009, pp. 1-187.

3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, pp. 1-74.

3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.

3rd Generation Partnership Project (3GPP), TS 36.213 V9.0.1, "Technical Specification Group Radio Access Network, Evolved Universal Terrestrial Radio Access (E-UTRA), Physical Layer Procedures (Release 9)", Dec. 2009, pp. 1-79.

3rd Generation Partnership Project (3GPP), TS 36.300 V8.11.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2009, pp. 1-148.

3rd Generation Partnership Project (3GPP), TS 36.300 V8.7.0, "Technical Specification Group Radio Access Network, Evolved Universal Terrestrial Radio Access (E-UTRA) and Evolved Universal Terrestrial Radio Access Network (E-UTRAN), Stage 2 (Release 8)", Dec. 2008, pp. 1-144.

3rd Generation Partnership Project (3GPP), TS 36.300 V9.2.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 9)", Dec. 2009, pp. 1-178.

3rd Generation Partnership Project (3GPP), TS 36.321 V8.3.0, "Technical Specification Group Radio Access Network, Evolved Universal Terrestrial Radio Access (E-UTRA) Medium Access Control (MAC) Protocol Specification (Release 8)", Sep. 2008, pp. 1-36.

3rd Generation Partnership Project (3GPP), TS 36.321 V8.4.0, "Technical Specification Group Radio Access Network, Evolved Universal Terrestrial Radio Access (E-UTRA) Medium Access Control (MAC) Protocol Specification (Release 8)", Dec. 2008, pp. 1-43.

3rd Generation Partnership Project (3GPP), TS 36.321 V8.8.0, "Technical Specification Group Radio Access Network, Evolved Universal Terrestrial Radio Access (E-UTRA) Medium Access Control (MAC) Protocol Specification (Release 8)", Dec. 2009, pp. 1-47.

3rd Generation Partnership Project (3GPP), TS 36.321 V9.1.0, "Technical Specification Group Radio Access Network, Evolved Universal Terrestrial Radio Access (E-UTRA) Medium Access Control (MAC) Protocol Specification (Release 9)", Dec. 2009, pp. 1-48.

Linlin, Yang, "Research on Handover Mechanism in 3GPP LTE System", Communications Technology, vol. 41, No. 8, 2008, pp. 1-4.

Murias, Ron, "IEEE 802.16m Amendment Working Document", IEEE 802.16m-09/0010, IEEE 802.16 Broadband Wireless Access Working Group, Available at <http://ieee802.org/16>, Jan. 29, 2009, 51 pages.

Wang et al., "The Evolution of LTE Physical Layer Control Channels", IEEE Communications Surveys & Tutorials, vol. 18, No. 2, Dec. 18, 2015, 19 pages.

3rd Generation Partnership Project (3GPP), R1-061954, "CQI for Rel-7 FDD MIMO Scheme", Philips, 3GPP TSG RAN WG1 Meeting #46, Tallinn, Estonia, Aug. 28-Sep. 1, 2006, 3 pages.

3rd Generation Partnership Project (3GPP), R1-081546, "Initial Multi-Carrier HSPA Performance Evaluation", Ericsson, 3GPP TSG RAN WG1 Meeting #52bis, Shenzhen, China, Mar. 31-Apr. 4, 2008, pp. 1-7.

3rd Generation Partnership Project (3GPP), R1-083539, "Single Code HS-DPCCH ACK/NACK Design for DC-HSDPA", Qualcomm Europe, 3GPP TSG-RAN WG1 #54-bis, Prague, Czech Republic, Sep. 28-Oct. 3, 2008, pp. 1-17.

3rd Generation Partnership Project (3GPP), R1-083540, "Single Code HS-DPCCH CQI Design for DC-HSDPA", Qualcomm Europe, 3GPP TSG-RAN WG1 #54-bis, Prague, Czech Republic, Sep. 28-Oct. 3, 2008, pp. 1-9.

3rd Generation Partnership Project (3GPP), R1-083730, "L1 Control Signaling with Carrier Aggregation in LTE-Advanced", Nokia, Nokia Siemens Networks, 3GPP TSG-RAN WG1 Meeting #54bis, Prague, Czech Republic, Sep. 29-Oct. 3, 2008, 6 pages.

3rd Generation Partnership Project (3GPP), R1-083975, "On the HS-DPCCH Structure for Dual-Cell HSDPA Operation", Ericsson, 3GPP TSG RAN WG1 Meeting #54bis, Prague, Czech Republic, Sep. 29-Oct. 3, 2008, 10 pages.

3rd Generation Partnership Project (3GPP), R1-084197, "Considerations on DL/UL Transmission in Asymmetric Carrier Aggregation", LG Electronics, 3GPP TSG RAN WG1 Meeting #55, Prague, Czech Republic, Nov. 10-14, 2008, 5 pages.

3rd Generation Partnership Project (3GPP), R1-084690, "Introduction of Dual-Cell HSDPA Operation on Adjacent Carriers", Huawei, 3GPP TSG-RAN WG1 Meeting #54bis, Prague, Czech Republic, Sep. 29-Oct. 3, 2008, 101 pages.

(56) References Cited

OTHER PUBLICATIONS

3rd Generation Partnership Project (3GPP), R1-094068, "HS-DPCCH ACK/NACK Code Book Design for 4C-HSDPA", Qualcomm Europe, 3GPP TSG RAN WG1 Meeting #58bis, Miyazaki, Japan, Oct. 12-16, 2009, pp. 1-57.
3rd Generation Partnership Project (3GPP), R2-081899, "Dual Cell HSDPA Operation Consideration", Huawei, 3GPP TSG-RAN WG2 #61bis, Shenzhen, China, Mar. 31-Apr. 4, 2008, 2 pages.
3rd Generation Partnership Project (3GPP), R4-081899, "Cubic Metric Impact Due to Transmission on HS-DPCCH", Qualcomm Europe, 3GPP TSG-RAN WG4 Meeting #48, Jeju Island, Korea, Aug. 18-22, 2008, 9 pages.
3rd Generation Partnership Project (3GPP), RP-090976, "Four Carrier HSDPA", Work Item Description, Sep. 2009, 6 pages.
3rd Generation Partnership Project (3GPP), TDOC R1-082532, "Control Channel Support for HSDPA Dual-Cell Operation", Philips, NXP, 3GPP TSG RAN WG1 Meeting #53bis, Warsaw, Poland, Jun. 30-Jul. 4, 2008, 6 pages.
3rd Generation Partnership Project (3GPP), TS 25.211 V8.3.0, "Technical Specification Group Radio Access Network, Physical Channels and Mapping of Transport Channels onto Physical Channels (FOD) (Release 8)", Dec. 2008, pp. 1-56.
3rd Generation Partnership Project (3GPP), TS 25.211 V8.6.0, "Technical Specification Group Radio Access Network, Physical Channels and Mapping of Transport Channels onto Physical Channels (FDD) (Release 8)", Dec. 2009, pp. 1-58.
3rd Generation Partnership Project (3GPP), TS 25.211 V9.1.0, "Technical Specification Group Radio Access Network, Physical Channels and Mapping of Transport Channels onto Physical Channels (FDD) (Release 9)", Dec. 2009, pp. 1-58.
3rd Generation Partnership Project (3GPP), TS 25.212 V8.4.0, "Technical Specification Group Radio Access Network, Multiplexing and Channel Coding (FDD) (Release 8)", Dec. 2008, pp. 1-107.
3rd Generation Partnership Project (3GPP), TS 25.212 V9.1.0, "Technical Specification Group Radio Access Network, Multiplexing and Channel Coding (FDD) (Release 9)", Dec. 2009, pp. 1-108.
Johansson et al., "Multi-Carrier HSPA Evolution", IEEE 69th Vehicular Technology Conference, VTC Spring 2009, Apr. 26-29, 2009, pp. 1-5.
Seidel, Eiko, "Standardisation Updates on HSPA Evolution", Nomor Research, GMBH, Munich, Germany, Mar. 2009, pp. 1-3.
Seidel et al., "White Paper—Dual Cell HSDPA and its Future Evolution", Nomor Research GmbH, Munich, Germany, Jan. 2009, pp. 1-5.
3rd Generation Partnership Project (3GPP), "TR 25.858 v 1.1.0", Rapporteur, R1-02-0435, 3GPP TDH RAN1#23, Orlando, Florida, Feb. 18-22, 2002, pp. 1-28.
3rd Generation Partnership Project (3GPP), "HSDPA Re-Pointing", Samsung, Tdoc R2-052528, 3GPP TSG-RAN Meeting #48bis, Cannes, France, Aug. 10-Oct. 14, 2005, pp. 1-6.
3rd Generation Partnership Project (3GPP), "Enhanced HSDPA Re-Pointing Scheme", Qualcomm Europe, R2-052568, 3GPP TSG-RAN WG2, Cannes, France, Oct. 10-14, 2005, pp. 1-9.
3rd Generation Partnership Project (3GPP), "HSDPA Re-Pointing", Philips, R2-052986, 3GPP TSG RAN WG2 Meeting #49, Seoul, Korea, Nov. 7-11, 2005, 4 pages.
3rd Generation Partnership Project (3GPP), "Resource Release Mechanisms for CELL-FACH E-DCH", Infineon, Tdoc, R2-080148, 3GPP TSG-RAN WG2 Meeting #60bis, Sevilla, Spain, Jan. 14-18, 2008, pp. 1-3.
3rd Generation Partnership Project (3GPP), "HS-DSCH Serving Cell Change Performance in Urban Canyon Environments", Qualcomm Europe, R2-080371, 3GPP TSG-RAN WG2 #60bis, Sevilla, Spain, Jan. 15-19, 2008, pp. 1-6.
3rd Generation Partnership Project (3GPP), "HS-PDSCH Serving Cell Change Enhancements", Ericsson, Tdoc R2-080785, 3GPP TSG-RAN WG2 #61, Sorrento, Italy, Feb. 11-15, 2008, pp. 1-3.

3rd Generation Partnership Project (3GPP), "Improving Reliability of HS-PDSCH Serving Cell Change Procedure", Qualcomm Europe, R2-081015, 3GPP TSGRAN WG2 #61, Sorrento, Italy, Feb. 11-15, 2008, pp. 1-8.
3rd Generation Partnership Project (3GPP), "Proposal for Supporting Real Time Service Over HSDPA", Lucent Technologies, Tdoc R1-050324, 3GPP TSG-RAN1 Meeting #40bis, Beijing, China, Apr. 4-8, 2005, 6 pages.
3rd Generation Partnership Project (3GPP), TS 25.212 V3.11.0, "Technical Specification Group Radio Access Network, Multiplexing and Channel Coding (FDD) (Release 1999)", Sep. 2002, pp. 1-62.
3rd Generation Partnership Project (3GPP), TS 25.212 V4.6.0, "Technical Specification Group Radio Access Network, Multiplexing and Channel Coding (FDD) (Release 4)", Sep. 2002, pp. 1-62.
3rd Generation Partnership Project (3GPP), TS 25.212 V5.10.0, "Technical Specification Group Radio Access Network, Multiplexing and Channel Coding (FDD) (Release 5)", Jun. 2005, pp. 1-72.
3rd Generation Partnership Project (3GPP), TS 25.212 V6.10.0, "Technical Specification Group Radio Access Network, Multiplexing and Channel Coding (FDD) (Release 6)", Dec. 2006, pp. 1-84.
3rd Generation Partnership Project (3GPP), TS 25.212 V7.10.0, "Technical Specification Group Radio Access Network, Multiplexing And Channel Coding (FDD) (Release 7)", Mar. 2009, pp. 1-103.
3rd Generation Partnership Project (3GPP), TS 25.212 V7.7.0, "Technical Specification Group Radio Access Network, Multiplexing and Channel Coding (FDD) (Release 7)", Nov. 2007, pp. 1-103.
3rd Generation Partnership Project (3GPP), TS 25.212 V8.1.0, "Technical Specification Group Radio Access Network, Multiplexing and Channel Coding (FOD) (Release 8)", Mar. 2008, pp. 1-103.
3rd Generation Partnership Project (3GPP), TS 25.212 V8.5.0, "Technical Specification Group Radio Access Network, Multiplexing And Channel Coding (FDD) (Release 8)", Mar. 2009, pp. 1-107.
3rd Generation Partnership Project (3GPP), TS 25.214 V3.12.0, "Technical Specification Group Radio Access Network, Physical Layer Procedures (FDD) (Release 1999)", Mar. 2003, pp. 1-52.
3rd Generation Partnership Project (3GPP), TS 25.214 V4.6.0, "Technical Specification Group Radio Access Network, Physical Layer Procedures (FDD) (Release 4)", Mar. 2003, pp. 1-53.
3rd Generation Partnership Project (3GPP), TS 25.214 V5.11.0, "Technical Specification Group Radio Access Network, Physical Layer Procedures (FDD) (Release 5)", Jun. 2005, pp. 1-51.
3rd Generation Partnership Project (3GPP), TS 25.214 V6.11.0, "Technical Specification Group Radio Access Network, Physical Layer Procedures (FDD) (Release 6)", Dec. 2006, pp. 1-60.
3rd Generation Partnership Project (3GPP), TS 25.214 V7.11.0, "Technical Specification Group Radio Access Network, Physical Layer Procedures (FDD) (Release 7)", Mar. 2009, pp. 1-87.
3rd Generation Partnership Project (3GPP), TS 25.214 V7.8.0, "Technical Specification Group Radio Access Network, Physical Layer Procedures (FDD) (Release 7)", Mar. 2008, pp. 1-85.
3rd Generation Partnership Project (3GPP), TS 25.214 V8.1.0, "Technical Specification Group Radio Access Network, Physical Layer Procedures (FDD) (Release 8)", Mar. 2008, pp. 1-87.
3rd Generation Partnership Project (3GPP), TS 25.214 V8.5.0, "Technical Specification Group Radio Access Network, Physical Layer Procedures (FDD) (Release 8)", Mar. 2009, pp. 1-92.
3rd Generation Partnership Project (3GPP), TS 25.308 V5.7.0, "Technical Specification Group Radio Access Network, High Speed Downlink Packet Access (HSDPA), Overall Description, Stage 2 (Release 5)", Dec. 2004, pp. 1-28.
3rd Generation Partnership Project (3GPP), TS 25.308 V6.4.0, "Technical Specification Group Radio Access Network, High Speed Downlink Packet Access (HSDPA), Overall Description, Stage 2 (Release 6)", Mar. 2007, pp. 1-29.
3rd Generation Partnership Project (3GPP), TS 25.308 V7.6.0, "Technical Specification Group Radio Access Network, High Speed Downlink Packet Access (HSDPA), Overall Description, Stage 2 (Release 7)", Mar. 2008, pp. 1-50.
3rd Generation Partnership Project (3GPP), TS 25.308 V7.9.0, "Technical Specification Group Radio Access Network, High Speed Downlink Packet Access (HSDPA), Overall Description, Stage 2 (Release 7)", Dec. 2008, pp. 1-51.

(56) References Cited

OTHER PUBLICATIONS

3rd Generation Partnership Project (3GPP), TS 25.308 V8.1.0, "Technical Specification Group Radio Access Network, High Speed Downlink Packet Access (HSDPA), Overall Description, Stage 2 (Release 8)", Mar. 2008, pp. 1-50.

3rd Generation Partnership Project (3GPP), TS 25.308 V8.5.0, "Technical Specification Group Radio Access Network, High Speed Downlink Packet Access (HSDPA), Overall Description, Stage 2 (Release 8)", Mar. 2009, pp. 1-61.

3rd Generation Partnership Project (3GPP), TS 25.331 V8.4.0, "Technical Specification Group Radio Access Network, Radio Resource Control (RRC), Protocol Specification (Release 8)", Sep. 2008, pp. 1-1543.

3rd Generation Partnership Project (3GPP), TS 25.331 V9.0.0, "Technical Specification Group Radio Access Network, Radio Resource Control (RRC), Protocol Specification Release 9)", Sep. 2009, 1711 pages.

\* cited by examiner

METHOD AND APPARATUS FOR TRANSMITTING DATA AND CONTROL INFORMATION ON MULTIPLE UPLINK CARRIER FREQUENCIES

CROSS REFERENCE TO REPLATED APPLICATIONS

This application is a continuation of U.S. application Ser. No. 16/667,835 filed Oct. 29, 2019, which is a continuation of U.S. application Ser. No. 16/016,095 filed Jun. 22, 2018, now U.S. Pat. No. 10,477,522, which is a continuation of Ser. No. 13/630,360 filed Sep. 28, 2012, now U.S. Pat. No. 10,039,085, which is a continuation of U.S. application Ser. No. 12/610,294 filed Oct. 31, 2009, now U.S. Pat. No. 8,295,779; which claims the benefit of U.S. provisional application Nos. 61/109,978 filed Oct. 31, 2008, 61/117,494 filed Nov. 24, 2008, 61/117,851 filed Nov. 25, 2008, 61/141, 638 filed Dec. 30,2008, and 61/148,690 filed Jan. 30, 2009, which are incorporated by reference as if fully set forth herein.

FIELD OF INVENTION

This application is related to wireless communications.

BACKGROUND

A number of improvements have been introduced in universal mobile telecommunication systems (UMTS) wireless communications systems to increase the data rates available to end users. Following the introduction of high speed downlink packet access (HSDPA) for the downlink in Release 5 of the third generation partnership project (3GPP), high speed uplink packet access (HSUPA) was introduced as part of Release 6 of the 3GPP to improved uplink performance. The HSUPA uses hybrid automatic repeat request (HARQ) combined with short transmission time intervals (TTI) and fast scheduling to improve the uplink throughput and peak data rate over the new enhanced dedicated channel (E-DCH).

As wideband code division multiple access (WCDMA) is an interference-limited system, tight control of the uplink transmission power of every wireless transmit/receive unit (WTRU) is important. This is achieved via a combination of power control and grant mechanism. A grant for E-DCH transmission is a maximal power ratio that a WTRU may use to transmit on the E-DCH. The grant is translated directly to a transport block size. In this context, the grant can be interpreted as a right to create interference on the uplink. In HSUPA, the network signals a grant to each WTRU separately. There are two types of grants signaled by the network: an absolute grant and a relative grant. The absolute grant is transmitted over an E-DCH absolute grant channel (E-AGCH) by the serving E-DCH cell and carries an index to a grant table. The relative grant may be transmitted by any cell in the E-DCH active set over an E-DCH relative grant channel (E-RGCH). The WTRU maintains a serving grant that the WTRU uses to determine how much data may be transmitted during a given TTI. This serving grant is updated every time a new grant command is received either over the E-AGCH or the E-RGCH.

In addition to the grant mechanism, HSUPA also takes advantage of the macro-diversity by allowing non-serving E-DCH cells to transmit HARQ positive acknowledgement (ACK) to WTRUs over an E-DCH HARQ indicator channel (E-HICH) whenever the transmitted data is correctly decoded. The serving E-DCH cell (and the non-serving E-DCH cells in the same radio link set (RLS)) transmits an ACK or a negative acknowledgement (NACK) over the E-HICH for each received HARQ transmission.

The downlink control channel specific to HSUPA comprises the E-AGCH, the E-RGCH, and the E-HICH. For proper operation of the system, a power control loop using a fractional dedicated physical channel (F-DPCH) on the downlink and a dedicated physical control channel (DPCCH) on the uplink is established.

In order to meet the growing needs for providing continuous and faster access to a data network, a multi-carrier system that is capable of using multiple carriers for the transmission of data has been proposed. The use of multiple carriers is expanding in both cellular and non-cellular wireless systems. A multi-carrier system may increase the bandwidth available in a wireless communication system according to a multiple of how many carriers are made available. For instance, as part of the evolution of the technology, a new feature called dual-cell HSDPA (DC-HSDPA) has been introduced in the Release 8 specifications of the 3GPP. With DC-HSDPA, a Node-B communicates to WTRUs over two distinct downlink carriers simultaneously. It not only doubles the bandwidth and the peak data rate available to WTRUs, but also has a potential to increase the network efficiency by means of fast scheduling and fast channel feedback over two carriers.

DC-HSDPA significantly increases the throughput and efficiency of the downlink in the wireless communications systems. The introduction of DC-HSDPA further augments the asymmetry between the uplink and downlink in terms of throughput and peak data rates. However, no proposals have been made for the uplink. Therefore, it would be desirable to provide a method for exploiting the multiple uplink carriers for increasing the peak data rates and transmission efficiencies in uplink transmissions.

SUMMARY OF THE INVENTION

A method and an apparatus for wireless transmission using multiple uplink carriers are disclosed. A WTRU may transmit via a primary uplink carrier a data channel, a pilot channel, and a control channel for uplink transmission on the primary uplink carrier and optionally a control channel for providing uplink feedback information related to downlink transmission, and transmit a data channel and a pilot channel via a secondary uplink carrier. Alternatively, the WTRU may transmit via a primary uplink carrier a data channel, a pilot channel, a control channel for uplink transmission on the primary uplink carrier and optionally a control channel for providing uplink feedback information related to downlink transmission, and transmit via a secondary uplink carrier a data channel, a pilot channel, and a control channel for uplink transmissions on the secondary uplink carrier.

Each uplink carrier may be associated with at least one specific downlink carrier such that the WTRU applies control information received on a downlink carrier to uplink transmissions on an uplink carrier associated with the downlink carrier on which the WTRU receives the control information. At least one radio network temporary identity (E-RNTI) may be configured per uplink carrier and the WTRU may apply a received absolute grant to uplink data transmissions (e.g., E-DCH) on an associated uplink carrier. At least one downlink control channel conveying uplink grant information (e.g., E-AGCH) may be associated to each uplink carrier and the WTRU may apply a received absolute grant to uplink transmission on an uplink carrier associated with a downlink control channel carrying the uplink grant information on which the absolute grant is received. One set of downlink control channels carrying relative uplink grant information (e.g., E-RGCH) and HARQ feedback information (e.g., E-HICH) may be associated to each uplink carrier, and the WTRU may apply received relative grant and HARQ feedback to uplink transmissions on an associated uplink carrier.

The WTRU may receive multiple transmit power control (TPC) commands, and adjust transmit power on an uplink carrier based on a corresponding TPC command. A TPC command for an uplink carrier may be received over a downlink carrier associated to that uplink carrier.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, a machine-to-machine (M2M) device, a sensor, or any other type of device capable of operating in a wireless environment. When referred to hereafter, the terminology "Node-B" includes but is not limited to a base station, a site controller, an access point (AP), or any other type of interfacing device capable of operating in a wireless environment.

The network may assign at least one downlink and/or at least one uplink carrier as an anchor downlink carrier and an anchor uplink carrier, respectively. For example, the anchor carrier may be defined as the carrier for carrying a specific set of control information for downlink/uplink transmissions. The anchor carrier may not be dynamically activated and deactivated. The uplink anchor carrier may be associated with the downlink anchor carrier. Any carrier that is not assigned as an anchor carrier is a supplementary carrier. Alternatively, the network may not assign an anchor carrier and no priority, preference, or default status may be given to any downlink or uplink carriers. For multi-carrier operation more than one supplementary carriers or supplementary carriers may exist. Hereinafter, the terminologies "anchor uplink/downlink carrier" and "primary uplink/downlink carrier" will be used interchangeably and the terminologies "secondary uplink/downlink carrier" and "supplementary uplink/downlink carrier" will be used interchangeably.

Embodiments for utilizing multiple uplink carriers in transmission of data and control information in HSPA systems, including various channel structures for the uplink carriers to covey user data and control information are disclosed. Even though embodiments are described in terms of dual uplink carrier, it should be understood that the embodiments described herein are applicable to multiple uplink carriers as well. Even though the embodiments are disclosed with reference to control channels and data channels associated to wideband code division multiple access (WCDMA), it should be noted that the embodiments are applicable to any wireless communication technologies that are currently existing or will be developed in the future, such as long term evolution (LTE) and LTE-Advanced. It should also be noted that the embodiments described herein may be applicable in any order or combinations.

Figure 1:
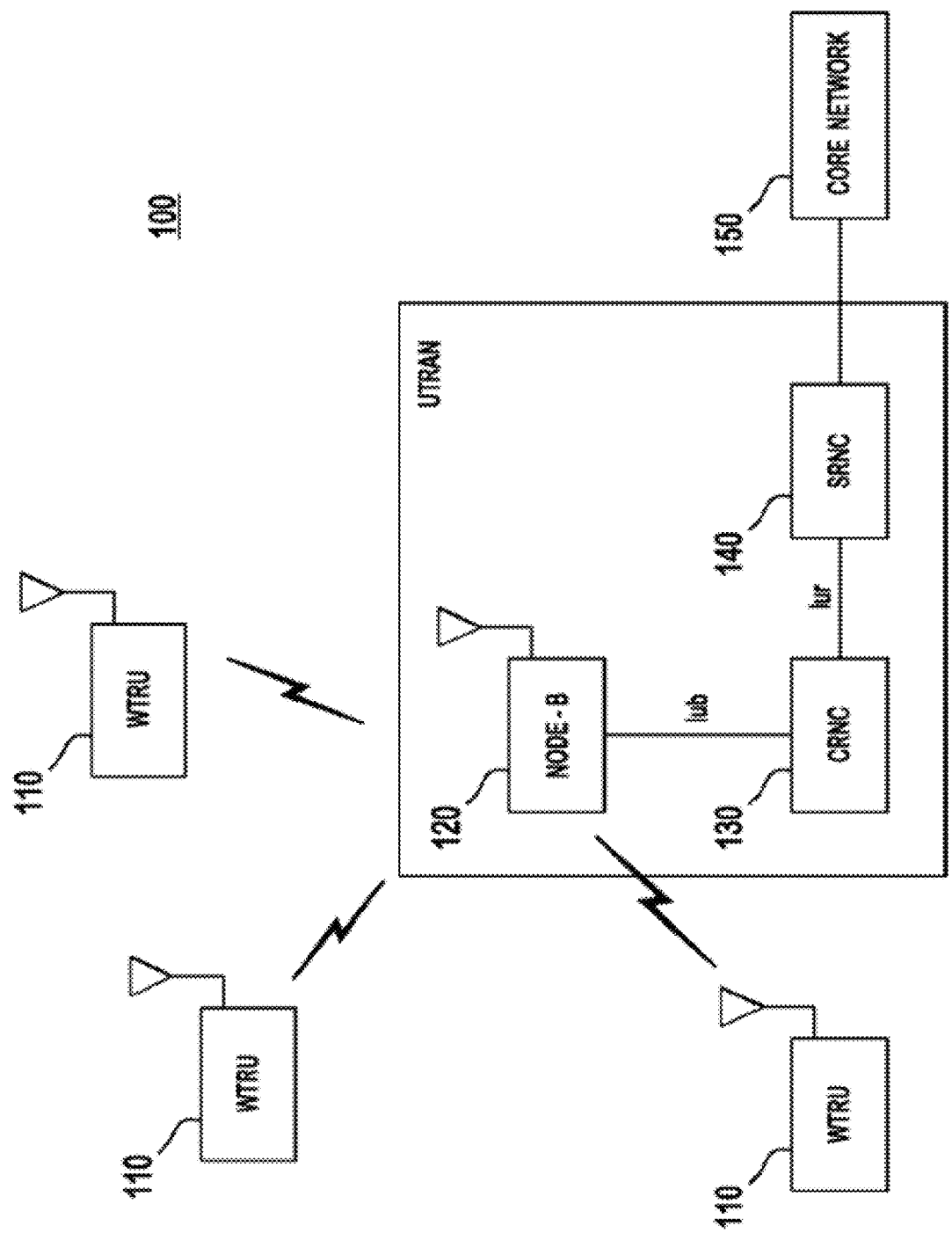
FIG. 1 shows an example wireless communication system.

FIG. 1 shows an example wireless communication system 100 including a plurality of WTRUs 110, a Node-B 120, a controlling radio network controller (CRNC) 130, a serving radio network controller (SRNC) 140, and a core network 150. The Node-B 120 and the CRNC 130 may collectively be referred to as the UTRAN.

As shown in FIG. 1, the WTRUs 110 are in communication with the Node-B 120, which is in communication with the CRNC 130 and the SRNC 140. Although three WTRUs 110, one Node-B 120, one CRNC 130, and one SRNC 140 are shown in FIG. 1, it should be noted that any combination of wireless and wired devices may be included in the wireless communication system 100.

Figure 2:
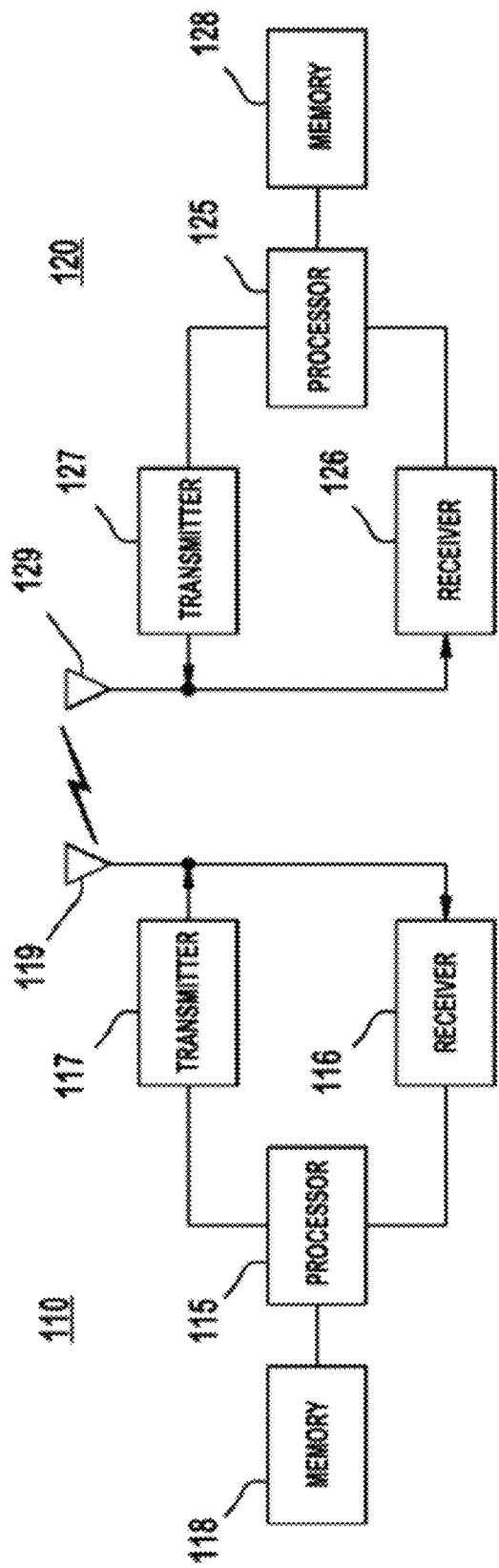
FIG. 2 is a functional block diagram of a WTRU and the Node-B of the wireless communication system of FIG. 1.

FIG. 2 is a functional block diagram of a WTRU 110 and the Node-B 120 of the wireless communication system 100 of FIG. 1. As shown in FIG. 1, the WTRU 110 is in communication with the Node-B 120 and both are configured to perform a method of performing uplink transmissions with multiple uplink carriers. The WTRU 110 includes a processor 115, a receiver 116, a transmitter 117, a memory 118, an antenna 119, and other components (not shown) that may be found in a typical WTRU. The memory 118 is provided to store software including operating system, application, etc. The processor 115 is provided to perform, alone or in association with the software, a method of performing uplink transmissions with multiple uplink carriers. The receiver 116 and the transmitter 117 are in communication with the processor 115. The receiver 116 and/or the transmitter 117 may be capable of receiving and/or transmitting over multiple carriers. Alternatively, multiple receivers or transmitters may be included in the WTRU 110. The antenna 119 is in communication with both the receiver 116 and the transmitter 117 to facilitate the transmission and reception of wireless data.

The Node-B 120 includes a processor 125, a receiver 126, a transmitter 127, a memory 128, an antenna 129, and other components (not shown) that may be found in a typical base station. The processor 125 is provided to perform, alone or in association with the software, a method of performing uplink transmissions with multiple uplink carriers. The receiver 126 and the transmitter 127 are in communication with the processor 125. The receiver 126 and/or the transmitter 127 may be capable of receiving and/or transmitting over multiple carriers. Alternatively, multiple receivers or transmitters may be included in the Node B 120. The antenna 129 is in communication with both the receiver 126 and the transmitter 127 to facilitate the transmission and reception of wireless data.

Figure 3:
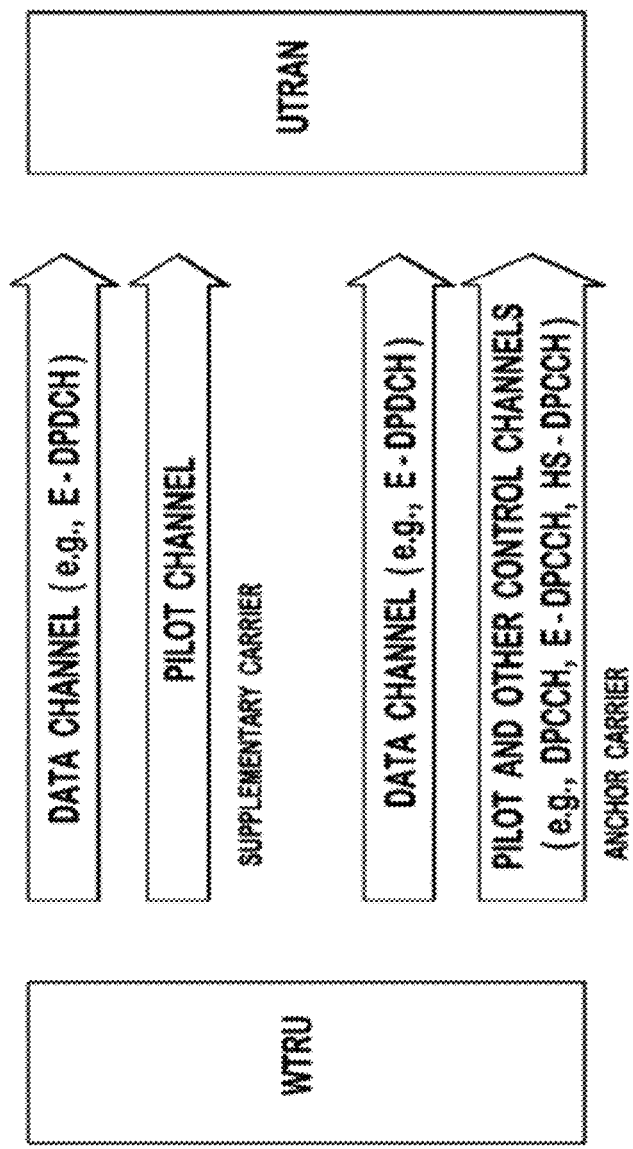
FIG. 3 shows an example that a WTRU transmits two uplink carriers to the UTRAN in accordance with one embodiment.

In accordance with one embodiment, a secondary uplink carrier carries traffic data with minimal or no control information. FIG. 3 shows an example that a WTRU transmits two uplink carriers to the UTRAN. The WTRU may transmit a data channel, (e.g., E-DCH dedicated physical data channel (E-DPDCH)), and pilot and other control channels, (e.g., DPCCH, E-DCH dedicated physical control channel (E-DPCCH), and/or HS-DSCH dedicated physical control channel (HS-DPCCH)), on the anchor uplink carrier, and transmit a data channel (e.g., E-DPDCH) and a pilot channel on the supplementary uplink carrier.

The anchor uplink carrier may carry all or most of the uplink control signaling that is sent to the UTRAN including at least one of, but not limited to: (1) feedback for downlink channels (such as HS-DPDCH) including channel quality information (CQI), precoding control indication (PCI), ACK/NACK HARQ information; (2) uplink radio link control information, (e.g., uplink DPCCH), including uplink pilot symbols, feedback information (FBI), and transmission power control (TPC) commands; or (3) E-DCH control information, (e.g., E-DPCCH), including retransmission sequence number (RSN) used for HARQ processing, E-DCH transport format combination index (E-TFCI) information indicating the size of the transmitted transport blocks, and a happy bit.

The data channel, (e.g., E-DPDCH), may convey user traffic on the anchor uplink carrier as illustrated in FIG. 3.

The supplementary uplink carrier may carry a user data channel (e.g., E-DPDCH) and a pilot channel. The pilot channel may be the conventional uplink DPCCH that carries pilot symbols as well as transmit power control (TPC) commands. The TPC commands may be used to control a secondary power control loop between the WTRU and the UTRAN that governs the downlink power for a secondary downlink carrier. Alternatively, the pilot channel may have a new slot format of the uplink DPCCH that includes pilot symbols. For example, all ten (10) bits of the conventional uplink DPCCH may be used to carry the pilot sequence. Alternatively, the pilot channel may be a new uplink control channel that carries pilot symbols that are used by the UTRAN to improve the reception of data on the secondary uplink carrier.

The E-DCH control information for both data sent on the anchor uplink carrier and data sent on the supplementary uplink carrier may be sent on the anchor uplink carrier. This E-DCH control information may be conveyed by defining a new slot format for E-DPCCH that includes control information for both uplink carriers or by transmitting two independent E-DPCCH channels on the anchor uplink carrier (one for the anchor uplink carrier and the other for the supplementary uplink carrier).

Figure 4A:
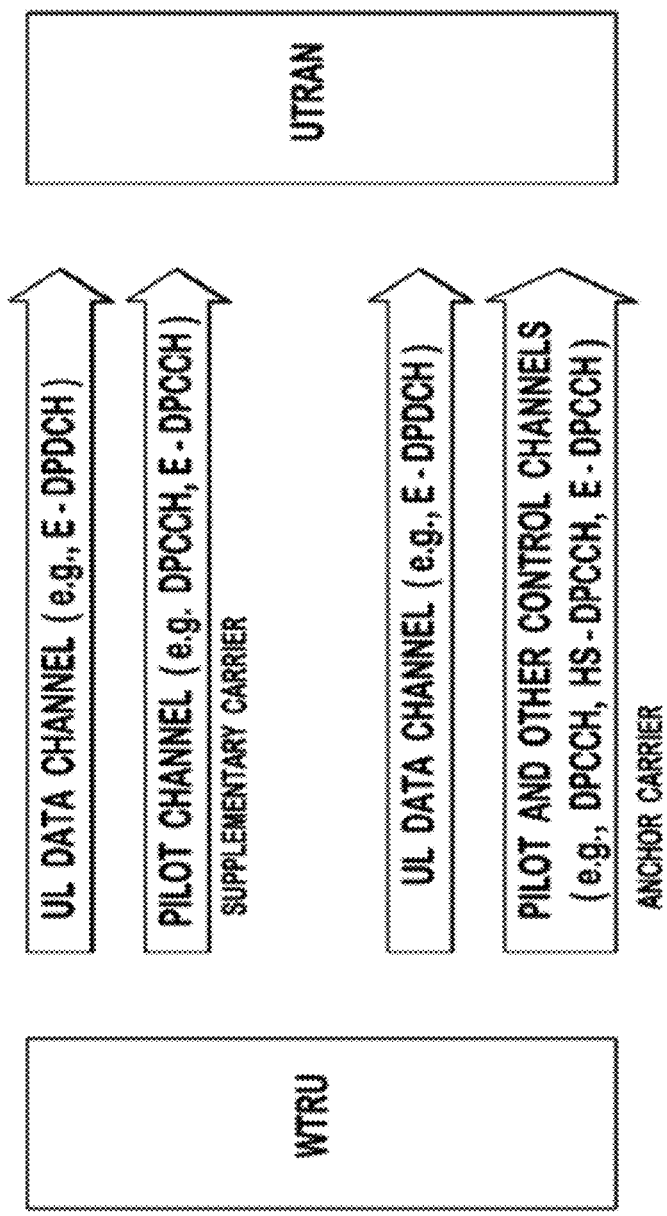
FIG. 4A shows an example that a WTRU transmits two uplink carriers to the UTRAN in accordance with another embodiment.

In accordance with alternate embodiment, the secondary uplink carrier may also carry the E-DCH control information that is associated with the transmission of the secondary uplink carrier, as shown in FIG. 4A. The E-DCH control information that is transmitted on the anchor uplink carrier is related to the data transmission on the anchor uplink carrier. A separate E-DPCCH may be sent on the secondary uplink carrier for transmitting the E-DCH control information in addition to the data and pilot channels (in a similar manner to single carrier operation). Alternatively, a new uplink control channel that includes both the pilot and E-DCH control information may be defined. The new uplink control channel may include uplink pilot symbols, FBI, TPC, RSN used for HARQ processing, E-TFCI information indicating the size of transmitted transport blocks, and/or happy bit. Alternatively, the new uplink control channel may include the pilot symbols, the RSN, and/or the E-TFCI information.

In case where the E-DPCCH is sent on both anchor and supplementary uplink carriers, the happy bit may be set on both uplink carriers as follows. The happy bit on each uplink carrier may be set according to the respective power headroom conditions and individual grants of each uplink carrier. Power headroom may be defined as the amount of power or ratio available for the transmission of uplink data. Alternatively, the power headroom may be the amount of power or ratio available over a reference uplink channel for the transmission of other uplink data and control channels. This means that the happy bit may be set to "happy" on one uplink carrier while the happy bit is set to "unhappy" one the second uplink carrier, if for instance there is enough power headroom to transmit at a higher data rate on the second uplink carrier, or if the grant on the second uplink carrier is lower.

Alternatively, the happy bit on one uplink carrier (e.g., the anchor uplink carrier) may be set according to the combined conditions (grant and power headroom) of both uplink carriers. In this case, the happy bit may be set to "unhappy" (1) if the WTRU is transmitting as much scheduled data as allowed by the current serving grants on both uplink carriers in E-TFC selection for both uplink carriers, (2) if the WTRU has enough power available to transmit at higher data rate on any or all of the uplink carriers; or (3) based on the same power offset(s) as the one selected in E-TFC selection (on both uplink carriers) to transmit data in the same TTI as the happy bit, if total E-DCH buffer status (TEBS) would require more than Happy_Bit_Delay_Condition ms to be transmitted with the current serving grants, taking into account the ratio of active processes to the total number of processes on each carrier.

If the happy bit on one uplink carrier is set according to the combined conditions of both uplink carriers, the happy bit on the second uplink carrier may be interpreted in one or a combination of the following:

(1) The happy bit may be set to "happy" if the power headroom on the second uplink carrier is larger than the power headroom on the first uplink carrier, and "unhappy" otherwise. This information helps the network determine which carrier the grant may be increased on; or (2) Alternatively, the happy bit on the second uplink carrier may be set as per the conventional rules for happy bit determination considering the grant and power headroom conditions on the second uplink carrier only (or on the first uplink carrier only).

All uplink carriers may have the same channel structure, including a data channel (e.g., E-DPDCH) and control channels (e.g., DPCCH, E-DPCCH or HS-DPCCH). Each uplink carrier may be paired with an associated downlink carrier. This may be advantageous for the case the carriers are located in different frequency bands and radio conditions may differ significantly between the carriers.

The number of uplink carriers and the number of downlink carriers may be the same. In this case, each uplink carrier may be paired with a downlink carrier. In an example case of two downlink carriers and two uplink carriers, downlink carrier 1 may carry all control information associated with uplink carrier 1, including uplink scheduling information (e.g., E-AGCH, E-RGCH), HARQ feedback (e.g., E-HICH), power control commands (e.g., via F-DPCH), or the like. Similarly, downlink carrier 2 may carry all control information associated with uplink carrier 2.

Uplink carrier 1 may carry all control information associated with downlink carrier 1, including downlink channel quality (e.g., CQI on HS-DPCCH), HARQ feedback (e.g., ACK/NACK on HS-DPCCH), power control commands (e.g., uplink DPCCH), or the like. Similarly, uplink carrier 2 may carry all control information associated with downlink carrier 2.

Figure 4B:
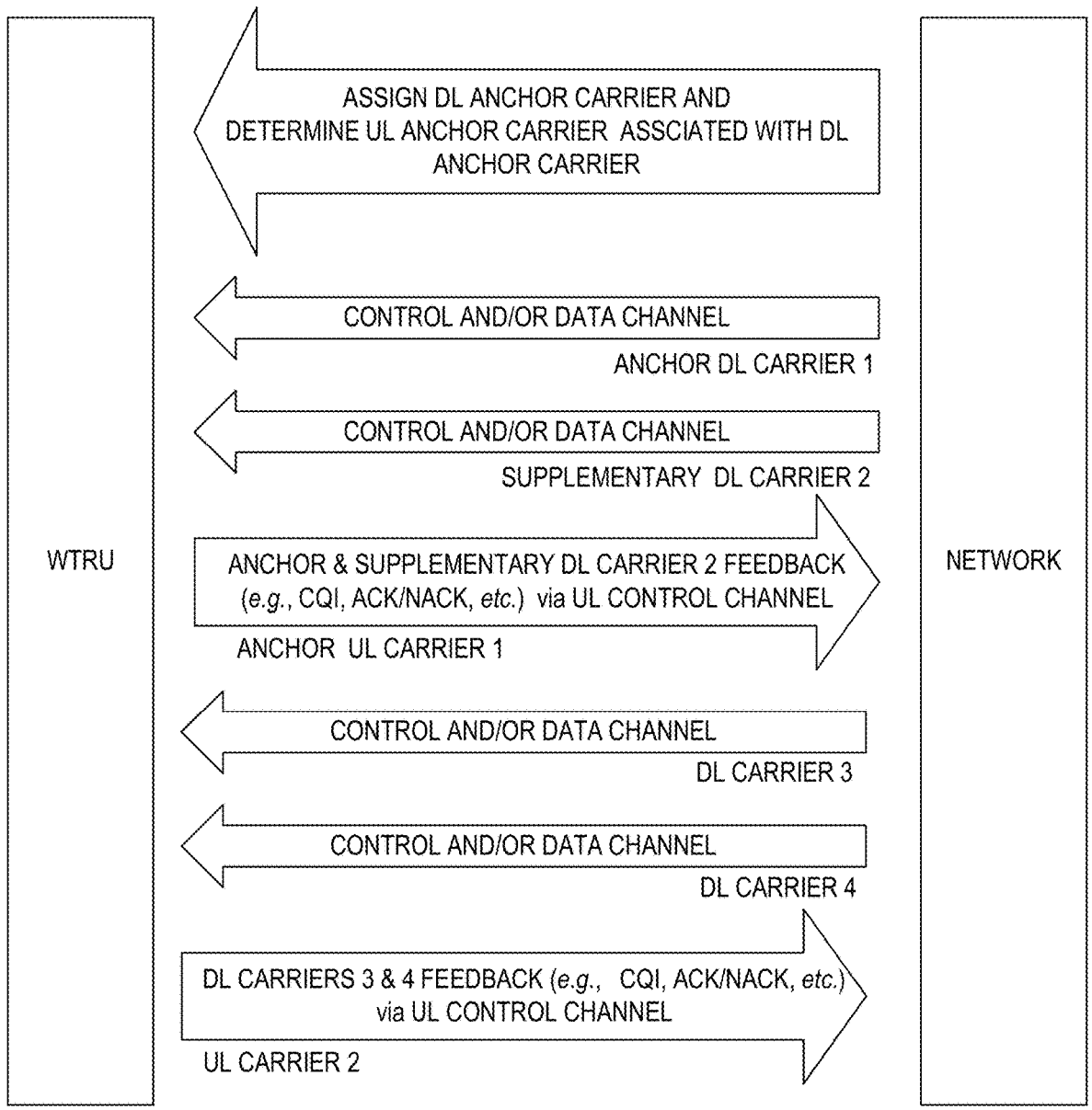
FIG. 4B shows an example that a WTRU operates using more downlink carriers than uplink carriers in accordance with another embodiment.

Alternatively, the number of downlink carriers may be more than the number of uplink carriers, as illustrated in FIG. 4B. In this case, it is allowed to receive more downlink carriers than are used for uplink transmissions. For example, in case that a WTRU is configured to simultaneously receive on four (4) downlink carriers while transmitting on two (2) uplink carriers, uplink carrier 1 may be matched to downlink carrier 1 (anchor) and downlink carrier 2 (supplementary), and uplink carrier 1 may carry any or all of the control information related to downlink carrier 1 and downlink carrier 2 including downlink channel quality (e.g., CQI on HS-DPCCH), HARQ feedback (e.g., ACK/NACK on HS-DPCCH), power control commands (e.g., uplink DPCCH) or the like. Uplink carrier 2 may be matched to downlink carrier 3 (anchor) and downlink carrier 4 (supplementary), and uplink carrier 2 may carry any or all of the control information related to downlink carrier 3 and downlink carrier 4 including downlink channel quality (e.g., CQI on HS-DPCCH), HARQ feedback (e.g., ACK/NACK on HS-DPCCH), power control commands (e.g., uplink DPCCH), or the like.

With multiple carriers on the uplink, the active set of the WTRU may be modified. A WTRU may maintain two active sets corresponding to each uplink carrier independently. The WTRU may have an active set including the E-DCH radio links on the anchor uplink carrier and another active set including E-DCH radio link on the supplementary uplink carrier. This would allow the network to configure some single cell Node-Bs and some dual cell Node-Bs in the same E-DCH active set.

Alternatively, the WTRU may maintain one active set, wherein each entry in the active set includes the radio links associated to both the anchor and supplementary uplink carriers. In this embodiment, the network may not configure the WTRU with single E-DCH configuration on some sectors and with dual E-DCH in some other sectors.

Alternatively, the non-serving cells of the E-DCH active set may comprise one carrier radio link and the serving cell may comprise two radio links (one corresponding to the anchor carrier and one to the supplementary carrier).

Embodiments for providing the necessary signaling to operate HSUPA over multiple carriers are explained hereafter.

In accordance with one embodiment, each uplink carrier may be associated with a specific downlink carrier for the control signaling. The association may be signaled by the network via radio resource control (RRC) signaling or may be implicitly known based on predefined set of rules. For example, in case that two uplink carriers and two downlink carriers are utilized, and uplink carrier A and downlink carrier A, and uplink carrier B and downlink carrier B are associated, a WTRU may apply the E-AGCH, E-RGCH and E-HICH commands received on downlink carrier A to the serving grant and HARQ processes associated to uplink carrier A. Likewise, the WTRU applies the E-AGCH, E-RGCH and E-HICH commands received on downlink carrier B to the serving grant and HARQ processes associated to uplink carrier B.

In accordance with another embodiment, the downlink carrier over which the E-AGCH, E-RGCH or E-HICH command is transmitted may not be directly linked to the uplink carrier to which these commands apply. The grants may be transmitted only on the anchor downlink carrier (or alternatively on any of the downlink carriers) and may be applied to any of the uplink carriers.

Embodiments for transmitting the absolute grant for multiple uplink carriers are explained hereafter.

In accordance with one embodiment, the network may configure one set of E-DCH radio network temporary identity (E-RNTI) for each uplink carrier at the WTRU. Each set of E-RNTI (i.e., primary E-RNTI and secondary E-RNTI) is associated to a given uplink carrier. Optionally, only the primary E-RNTI may be configured for each uplink carrier. The WTRU monitors the E-AGCH for all the E-RNTIs configured, and when one of the E-RNTI configured is detected, the WTRU applies the command carried over the E-AGCH to the uplink carrier associated to the decoded E-RNTI. The association of E-RNTI to uplink carrier is valid regardless of the downlink carrier over which the E-AGCH is transmitted.

Alternatively, the network may configure at least one E-AGCH (i.e., E-AGCH channelization code) associated to each uplink carrier. The WTRU monitors all E-AGCH (i.e., all E-AGCH channelization codes configured). When the WTRU detects its E-RNTI (primary or secondary) on the configured E-AGCHs, the WTRU applies the corresponding command to the uplink carrier associated to the E-AGCH channelization code over which the command was transmitted.

Alternatively, the WTRU may apply the received E-AGCH command to one of the uplink carrier based on the timing. For example, the uplink carrier index to which the command applies to may be a function of the E-AGCH subframe number and the connection frame number (CFN) (or system frame number (SFN)) of the received E-AGCH. In addition, at a given sub-frame, the time offset between the sub-frame when the E-AGCH command is transmitted and the sub-frame of the corresponding E-DCH transmission may be different depending on the uplink carrier. For instance, the time offset may be approximately 5 sub-frames for uplink carrier #1 but one (1) less sub-frame (i.e., about.4 sub-frames) for uplink carrier #2. The time offsets may be swapped every HARQ cycle (8 TTIs for 2 ms TTI and 4 TTIs for 10 ms TTI) to allow absolute grant commands to address any HARQ process for both carriers.

Alternatively, in the special case of two uplink carrier, the absolute grant scope bit carried on the E-AGCH may be re-interpreted to indicate the uplink carrier to which the accompanying absolute grant command applies to.

Alternatively, the physical layer format of the E-AGCH may be modified to support two or more uplink absolute grant commands. This may be achieved by reducing the absolute grant granularity (from 5 bits to lower values), by re-interpreting the absolute grant scope bit to carry other information, by changing the channel coding scheme to support more information, or by sharing the absolute grant scope bit among all uplink carriers, or in any combination thereof.

Alternatively, the E-AGCH format may be modified such that an additional field is added to the absolute grant message to explicitly indicate the uplink carrier to which this absolute grant command is applicable to. Depending on the number of carriers in the uplink this field may be 1 bit for dual cell operation or two bits to support up to 4 carriers.

Alternatively, the WTRU may be provided with a single grant value that applies to the combined transmissions on both carriers. The signaled grant (power ratio) may be translated into a number of bits (or a data rate) and the WTRU may not be allowed to transmit a higher total number of bits (or at a total higher data rate) over both carriers. Alternatively, the linear sum of the E-DPDCH/DPCCH power ratios of both carriers may not be allowed to exceed the signaled grant.

The restriction signaled by this single grant may be combined with other restrictions to determine the proper sharing between the two carriers. For instance, the network may signal semi-statically or dynamically a maximum grant on either (or both) uplink carrier for interference control purposes. Conventional mechanisms to control the grant on individual carriers may be used in conjunction with the shared grant. In this case the shared grant may be identified with a distinct E-RNTI value.

Embodiments for transmitting the relative grant and HARQ indication for multiple uplink carriers are explained hereafter.

In accordance with one embodiment, one set of E-RGCH and E-HICH (for each radio link) may be configured for each uplink carrier. A different set of E-RGCH and E-HICH may share the same channelization code with different signatures, or may use a different channelization code altogether. Each set is associated to a specific uplink carrier. This association may be indicated via explicit signaling or may be implicitly known by pre-defined rules. The E-RGCH and E-HICH are then transmitted over a pre-defined downlink carrier, independently of the uplink carrier association. For example, all sets of E-RGCH and E-HICH may be transmitted over the serving HS-DSCH cell (the anchor downlink carrier). A certain E-RGCH may be associated to both uplink carriers, and in this case, an UP (or DOWN) command would raise (or lower) the grant on both uplink carriers simultaneously.

Alternatively, each uplink carrier may be associated to one downlink carrier. The network configures one set of E-RGCH and E-HICH (for each radio link) per uplink carrier, which is transmitted over the associated downlink carrier. The WTRU monitors the E-RGCH and E-HICH over each downlink carrier and applies the received command to the associated uplink carrier. For instance, if uplink carrier A is associated to downlink carrier A, then the E-HICH and E-RGCH commands received over downlink carrier A are applied to the uplink carrier A.

The WTRU may receive E-RGCH and E-HICH from non-serving Node-Bs for each uplink carrier. Since the non-serving Node-Bs may not be capable of dual uplink operation, separate E-DCH active sets may be defined for each uplink carrier. A WTRU may receive non-serving E-RGCH or E-HICH from a non-serving Node-B for at least one of the uplink carriers. For the same reason, separate active sets may be defined for each uplink carriers for power control purposes. In this case, the WTRU may receive TPC commands (on the DPDCH or F-DPCH) from a Node-B for one of the uplink carriers.

If parallel control for the uplink carriers is not allowed, the WTRU may not have to maintain a separate active set for each carrier. One active set may be defined and the downlink control signaling may be monitored from the active set of the downlink anchor carrier.

Due to the overhead associated to the supplementary uplink carrier, it may be desirable to constrain the use of the supplementary carrier or the use of two uplink carriers at a time to WTRUs in burst periods. In this context, it may be efficient to allocate the uplink resources (i.e., only the supplementary uplink carrier or alternatively both supplementary and anchor uplink carriers) to a single WTRU at a time, (i.e., one WTRU at a given time is allowed to transmit on both carriers or the supplementary carrier, and all other WTRUs are allowed to transmit only on the anchor carrier).

In accordance with one embodiment, a WTRU may be scheduled or configured to use its grant on the supplementary uplink carrier or on both uplink carriers for a predefined or configured period of time. The WTRU may be transmitting on only one uplink carrier, (either the anchor or supplementary uplink carrier), and the scheduler schedules the WTRU on both uplink carriers. This allows the network to minimize the signaling when switching the resource among WTRUs.

In an initial state, a WTRU is transmitting an E-DCH only on the anchor uplink carrier or only on the supplementary uplink carrier (only one uplink carrier may be activated and the other uplink carrier may or may not be activated). When the WTRU has large amount of data to transmit, the network may decide to temporarily provide a grant on the uplink carrier that is not currently being used. In order to signal or trigger the WTRU to initiate transmission on both uplink carriers, one or a combination of the following conditions may be used: (1) The WTRU receives a non-zero grant associated to the uplink carrier on which it is not currently transmitting data (i.e., E-DCH) on; (2) The WTRU has a non-zero grant and at least one active HARQ process on the anchor uplink carrier or on the supplementary uplink carrier, and receives a non-zero grant for the uplink carrier on which it is not currently transmitting; or (3) The WTRU has a non-zero grant and all HARQ processes activated on the anchor uplink carrier or the supplementary uplink carrier, and receives a non-zero grant for the uplink carrier on which it is not currently transmitting.

The WTRU may be signaled to initiate transmission on the other carrier using one or a combination of the following ways. The WTRU may be assigned an E-RNTI (referred to as "dual cell E-RNTI" hereafter) which is used to indicate to the WTRU to start transmission on both carriers. The WTRU may also have a single cell E-RNTI or two separate E-RNTIs for single cell use (one for the anchor and one for the supplementary). If E-AGCH is masked with the dual cell E-RNTI, the WTRU initiates transmission on both uplink carriers at the HARQ process corresponding to the given E-AGCH. The grant signaled on the E-AGCH with the dual cell E-RNTI may be used on the new uplink carrier to be used, and the WTRU may continues with the existing serving grant on the carrier in which the WTRU was already transmitting. Alternatively, the grant signaled on the E-AGCH with the dual cell E-RNTI may be used for both uplink carriers. Alternatively, the grant signaled on the E-AGCH with the dual cell E-RNTI may be split in half between both uplink carriers.

Alternatively, the absolute grant table may be extended to allow signaling of higher value than the current absolute grant values. If the absolute grant is indicating a value above 30, the WTRU may take this as an indication to initiate transmission on the other uplink carrier. The grant to use on both uplink carriers may correspond to the AG split between the uplink carriers. Alternatively, the AG on the new carrier may correspond to the signaled AG minus the serving grant of the current carrier. Alternatively, the AG index on the new carrier may correspond to the signaled AG minus 30. Alternatively, the serving grant used for the current carrier may also be used for the new carrier.

Any of the methods described herein may be used to signal a grant on the other carrier, (for example a change of the absolute grant message such that absolute grant indexes may be signaled along with a new bit indicating the uplink carrier to which the grant applies).

Alternatively, an indication bit may be signaled on the E-AGCH that indicates the WTRU to start transmission on both carriers. Upon reception of the message on the E-AGCH the WTRU may start transmission on the other uplink carrier, either using the same serving grant as the current uplink carrier or alternatively using a serving grant corresponding to the absolute grant carried on the same E-AGCH as the indication bit.

In the above trigger conditions, the absolute grant scope may be set to a specific value ("all" or "single").

When non-persistent grant on the carrier on which the WTRU is not currently transmitting is triggered, the WTRU synchronizes the new uplink carrier, if not already done. Synchronization on the new carrier may also include transmission of DPCCH preamble prior to initiation of E-DCH transmission on the new carrier.

The WTRU may also start a non-persistent timer. The non-persistent timer may correspond to a time value or to a number of TTIs. This value may be predetermined by the WTRU or signaled/configured to the WTRU via RRC signaling.

The WTRU begins E-DCH transmission using the signaled non-persistent grant using one of the methods described above. Alternatively, the WTRU may ignore the value of the grant and use the maximum grant. Alternatively, the WTRU may ignore the value of the grant signaled and use a maximum value signaled by the network. Alternatively, the WTRU may us a pre-configured non-persistent grant signaled by the network via RRC signaling or pre-determined by the WTRU.

Once the non-persistent timer expires, the serving grant associated to the new uplink carrier takes a value of zero, and/or all HARQ processes associated to the new uplink carriers are de-activated. The WTRU thus stops initiating new HARQ transmissions on the new carrier. Optionally, once all HARQ retransmissions on the new carrier are completed the WTRU may implicitly de-activate the new carrier. Optionally, the WTRU may send SI either piggy-backed at the end of the last HARQ transmission allowed as per the non-persistent timer or by itself after the timer has expired. The value of the non-persistent timer may be configured by the network, may be WTRU or cell-specific.

For fast group grant switching, WTRUs may be configured by the network with one dedicated E-RNTI and one shared E-RNTI. The network may use the shared E-RNTI to reduce the serving grant to the group of WTRUs to a signaled or configured value (e.g., null), or to restore the serving grant to its previous value, optionally with a common offset. With this functionality, the network may free the uplink resource in a cell using the shared E-RNTI and allocate it to a single WTRU, and later it may resume the grant to the group of WTRUs to the previous state.

Figure 5:
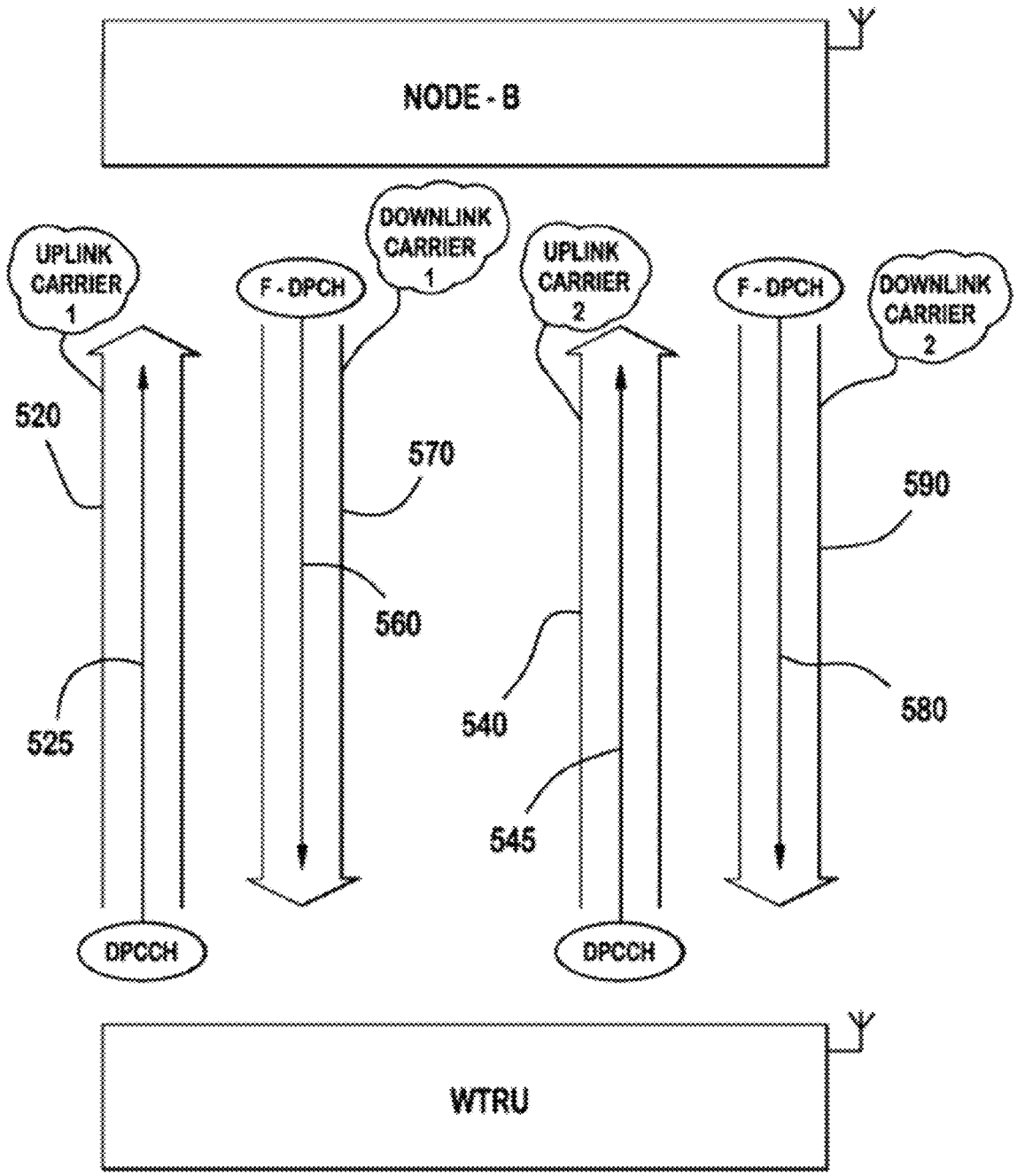
FIG. 5 is a functional block diagram wherein two uplink carriers are controlled by transmit power control (TPC) commands transmitted to a WTRU on two downlink carriers.

Referring now to FIG. 5, embodiments to perform power control on both uplink carriers 520, 540 (i.e., in a dual-carrier scenario) and allocate power and data across the uplink carriers are described hereafter. It is noted that while specific channels are shown being carried by uplink and downlink carriers in FIGS. 5-7 and FIG. 9, any channels may be carried in such carriers.

In accordance with one embodiment, the transmission powers of the uplink dedicated physical control channel (DPCCH) transmissions 525, 545 on both uplink carriers 520, 540 are controlled by two separate transmit power control (TPC) commands transmitted by the Node-B. One TPC command controls the power of the first uplink carrier 520 and the other TPC command controls the power of the second uplink carrier 540. The WTRU varies the power of the DPCCH 525, 545 on each uplink carrier 520, 540 based on the corresponding TPC command A Node-B may transmit a TPC command for an uplink carrier over an F-DPCH 560, 580 on a downlink carrier 570, 590 corresponding to that uplink carrier 520, 540 respectively. A mapping between the uplink carrier and the downlink carrier may be pre-defined. The WTRU typically obtains the TPC commands by listening to two channels (e.g., F-DPCH) transmitted over two different downlink carriers, but of course different channels may be used for transmitting such commands.

Figure 6:
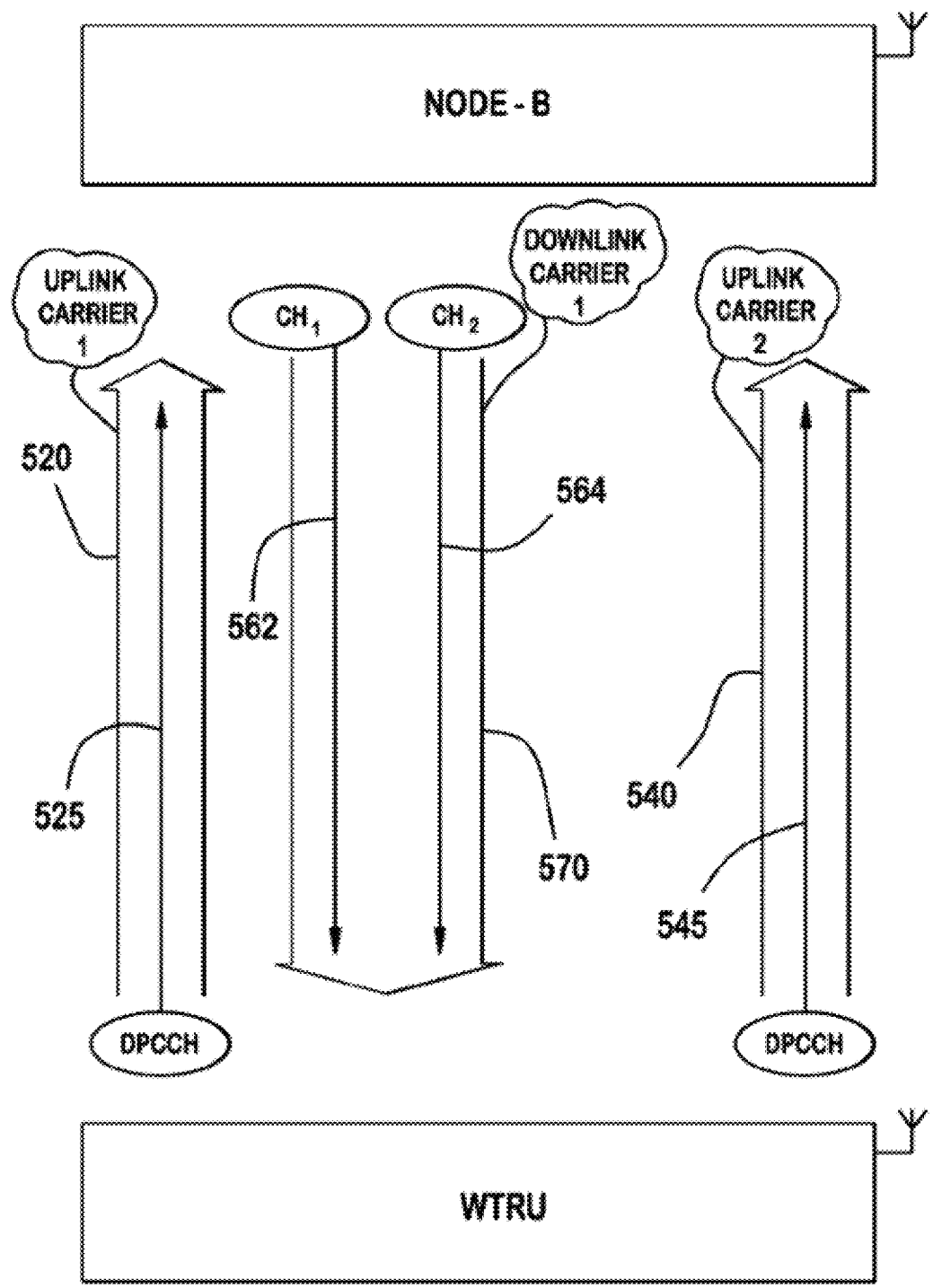
FIGS. 6 and 7 are functional block diagrams wherein two uplink carriers are controlled by transmit power control (TPC) commands transmitted to a WTRU on a single downlink carrier.

Alternatively, referring now to FIG. 6, the TPC commands for the two uplink carriers 520, 540 may be transmitted on two different channels 562, 564 on the same downlink carrier 570 (either one of the downlink carriers 570 or 590 may be used, but 570 is shown as being used in this embodiment). In this embodiment, the WTRU is not required to listen to both downlink carriers 570 and 590 if there is no other activity on at least one of the downlink carriers.

Figure 7:
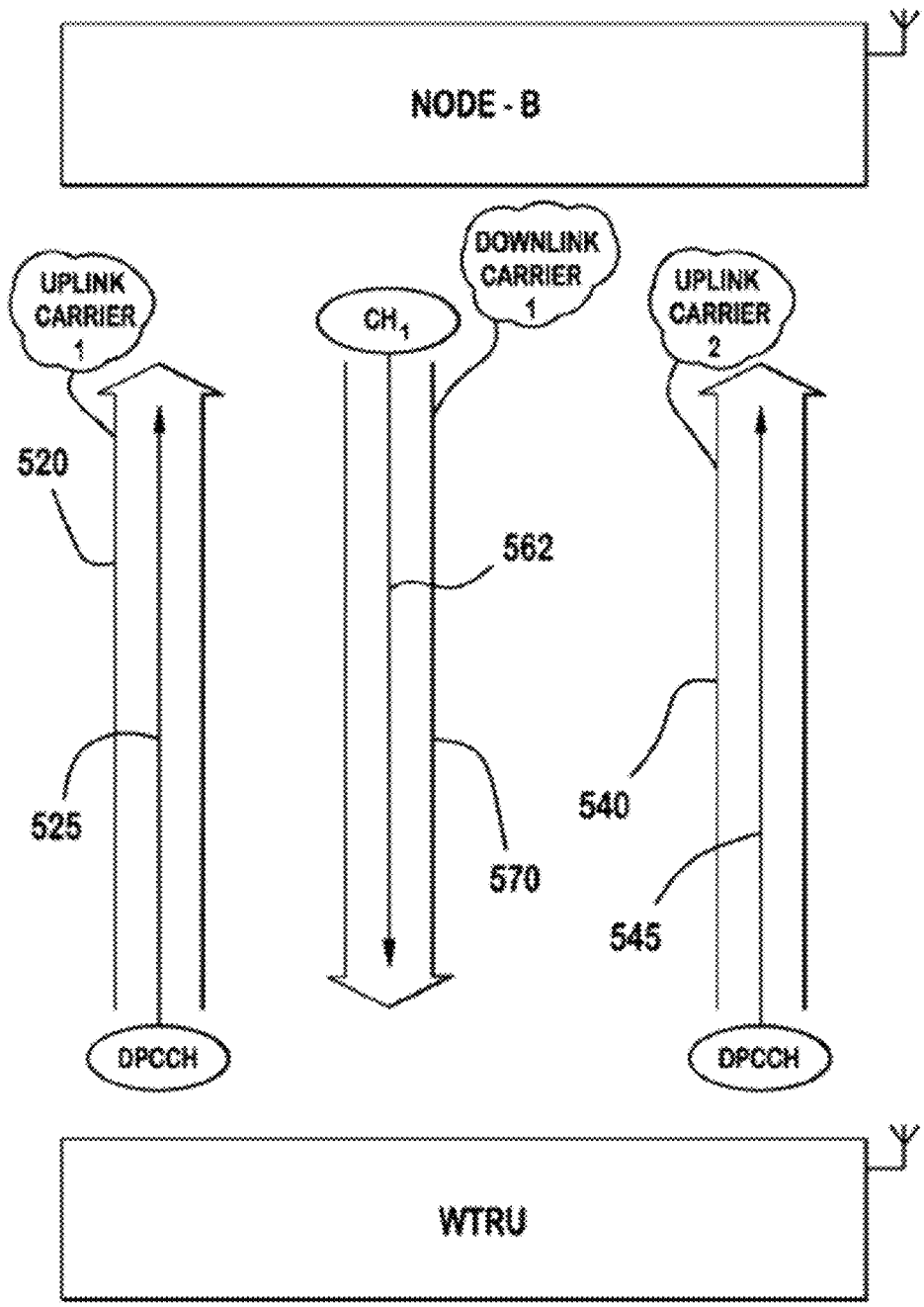
Figures 8, 11:
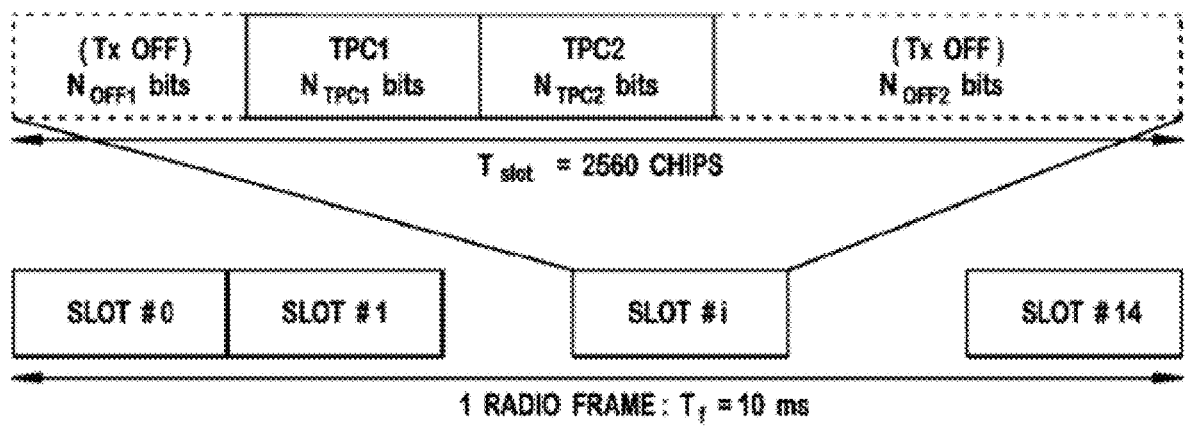
FIG. 8 shows an example F-DPCH slot format in accordance with one embodiment.
FIG. 11 shows scheduling information format in accordance with one embodiment.

In a further alternative embodiment, shown in FIG. 7, the TPC commands for the two uplink carriers 520, 540 may be carried over a single channel 562 (e.g., F-DPCH) in a single downlink carrier 570 (again, either one of the downlink carriers 570 or 590 may be used, but 570 is shown as being used in this embodiment). FIG. 8 shows an example F-DPCH slot format in accordance with this alternative embodiment. An F-DPCH slot format includes two TPC fields per slot, where TPC1 and TCP2 each contain a power control command (UP or DOWN) for uplink carrier 1 and uplink carrier 2, respectively.

Referring again to FIG. 7, in another alternative embodiment, where power control commands for both uplink carriers are transmitted on a single channel 562 such as the F-DPCH channel, the power control commands are time multiplexed. The time-multiplexing of power control commands may be achieved in a number of different ways. The power control commands may evenly alternate between uplink carrier 1 520 and uplink carrier 2 540. For example, the uplink carrier for which the power control command is destined may be determined as:

If (current connection frame number (CFN)+slot number) modulo 2=0, then TPC is for uplink carrier 1;

Else, TPC is for uplink carrier 2.

For example, power control commands for uplink carrier 1 520 may be carried in radio slots #0, 2, 4, 6, 8, 10, 12, and 14; whereas power control commands for uplink carrier 2 540 may be carried in radio slots #1, 3, 5, 7, 9, 11, and 13, or vice versa. Alternatively, more power control commands may be allocated to uplink carrier 1 520 than uplink carrier 2 540. For example, power control commands for uplink carrier 1 520 may be carried in radio slots #0, 1, 3, 4, 6, 7, 9, 10, 12, and 13, whereas power control commands for uplink carrier 2 540 may be carried in radio slots #2, 5, 8, 11, and 14. This alternative may be used if there is a reason why providing more power control commands will increase overall efficiency. Such a scenario may be, for example, where uplink carrier 1 520 is carrying more physical layer channels than uplink carrier 2 540.

Synchronization may also be defined on a per-carrier basis. The WTRU may apply the synchronization procedure on both carriers separately. The WTRU may be allowed to transmit on a carrier depending on the synchronization status on that carrier. Radio link failure may be declared upon loss of synchronization on both carriers.

Still referring to FIG. 7, in yet another alternative of the scenario where power control commands for both uplink carriers are transmitted on a single channel 562 such as the F-DPCH, the transmission powers of the DPCCH transmissions on both uplink carriers may be controlled by a single TPC command transmitted by the Node-B on, in this scenario, the F-DPCH. When the TPC command from the Node-B indicates to increase the power, the power is (e.g., equally) increased on both uplink carriers, and when the TPC command indicates to decrease the power, the power is (e.g., equally) decreased on both uplink carriers. For example, the power control commands may be joint-coded into a single TPC field. Example joint coding of the TPC commands is shown in Table 1 for $N_{TPC}=2$ and $N_{TPC}=4$, where $N_{TPC}$ is the number of TPC command bits.

TABLE 1

| TPC Bit Pattern | | TPC Command | |
| --- | --- | --- | --- |
| $N_{TPC} = 2$ | $N_{TPC} = 4$ | $N_{TPC} = 2$ | $N_{TPC} = 4$ |
| 00 | 0000 | 0 | 0 |
| 01 | 0011 | 0 | 1 |
| 10 | 1100 | 1 | 0 |
| 11 | 1111 | 1 | 1 |

Figure 9:
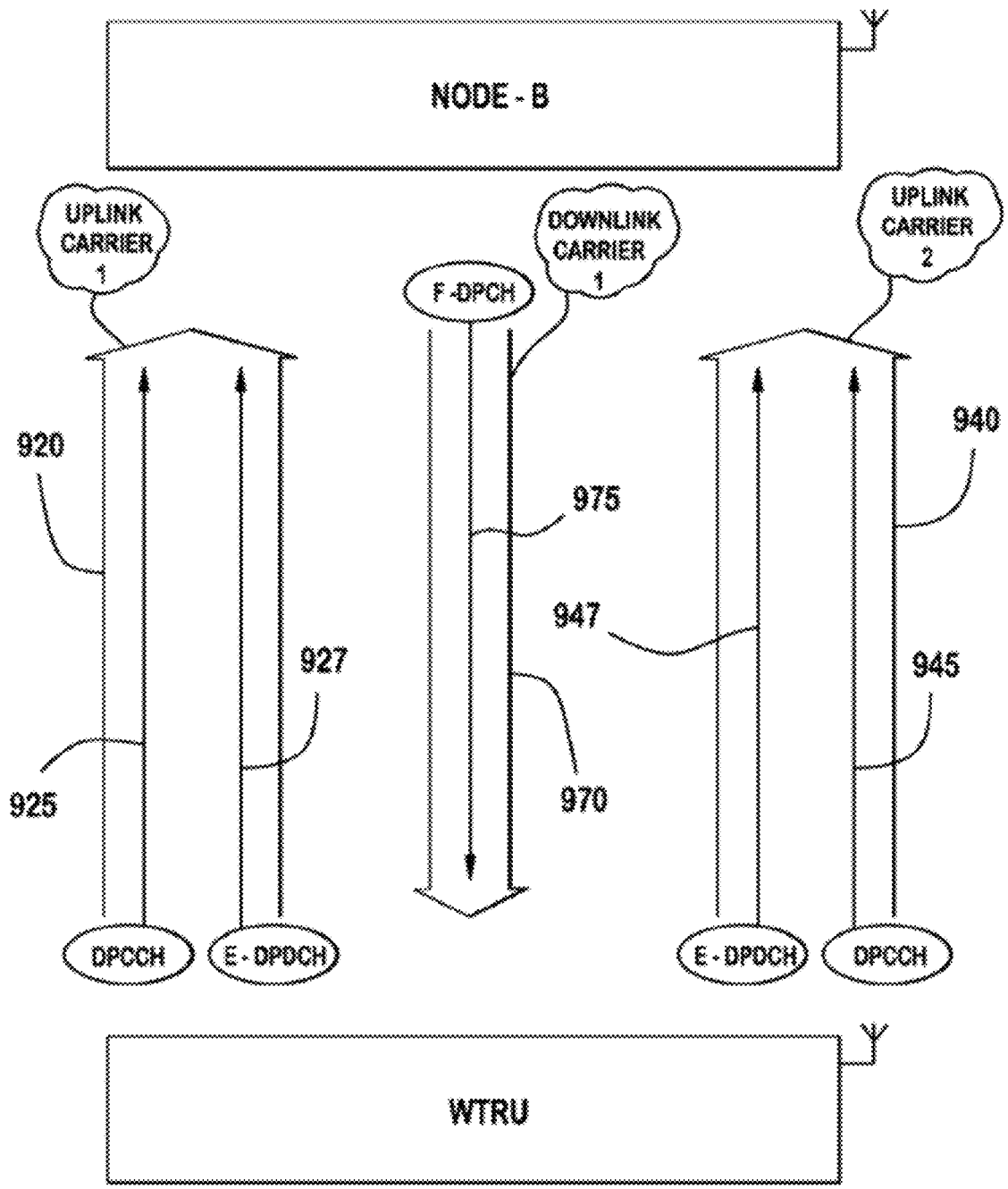
FIG. 9 is a functional block diagrams wherein transmit power control (TPC) commands are sent in the uplink in a multiple uplink carrier environment.

Referring now to FIG. 9, the following embodiments are in relation to the uplink transmission of transmit power control (TPC) commands from the WTRU to the Node-B on the uplink DPCCH for purposes of downlink power control. The WTRU may transmit a TPC command on the uplink DPCCH 925 of only one of the uplink carriers (in this example 920). On another uplink carrier (in this case 940), the WTRU may use either discontinuous transmission (DTX) in place of transmitting the TPC bits, or a new slot format with no TPC field. The TPC command may be derived from the quality measured on the downlink carrier 970 on which a downlink channel such as, for example, the F-DPCH 975 is transmitted. This approach has an advantage of somewhat reducing the interference from the WTRU. The WTRU may transmit the uplink DPCCH 925, 945 with only the pilot bits used for channel estimation by the Node-B.

Alternatively, the WTRU may transmit the same TPC command on the uplink DPCCH 925, 945 of both uplink carriers 920, 940. The TPC command may be derived from the quality measured on the downlink carrier 970 on which the F-DPCH 975 is transmitted. The Node-B may combine the TPC command signals from the two uplink DPCCHs 925, 945 to improve reliability of the TPC signals from the WTRU.

Alternatively, the WTRU may transmit independent TPC commands on the uplink DPCCH 925, 945 of each uplink carrier 920, 940. In this case, the TPC command sent on an uplink carrier 920, 940 may be derived based on the signal quality measured from the corresponding downlink carrier(s) (not shown) independently of the downlink carrier on which the F-DPCH 970 is transmitted. This scheme has the benefit of providing the network with some additional information regarding the downlink channel.

Since the uplink channels 925, 927, 945 on the two uplink carriers may not behave the same, it is possible that the channel quality changes on one carrier 920 differently than on another carrier 940. It is also possible that the channel quality on one carrier 920 changes whereas channel quality does not change on another carrier 940. In one example, channel quality degrades on one uplink carrier 920 while it improves on the other uplink carrier 940. In this case the Node-B has different options for setting the value of the TPC bits on the F-DPCH 975. The Node-B may set the TPC bit to "up" whenever the quality from one of the carriers 920, 940 is below a threshold, and "down" otherwise. This option may result in the uplink DPCCH power being high on one of the carriers 920, 940 making channel estimation easier for the Node-B. Alternatively, the Node-B may set the TPC bit to "down" whenever the quality from one of the carriers 920, 940 is above a threshold, and "up" otherwise. This option may result in the uplink DPCCH 925, 945 power being lower than a threshold for one of the carriers 920, 940 so the Node-B may derive an acceptable channel estimate on this carrier using the information from the other carrier.

If the average uplink interference (noise rise) level is not the same on both uplink carriers 920, 940, there may be a long-term and significant discrepancy in channel quality between the uplink carriers. The WTRU may apply an offset to the transmission power of one of the uplink carriers (e.g., 920) compared to the other uplink carrier (e.g., 940). This offset may be signaled by the network via higher layer signaling, (e.g., RRC signaling), or the like. The network may set the offset so that the average signal quality from both uplink carriers 920, 940 would be the same or similar.

The network may define different sets of reference E-DCH transport format combination index (E-TFCI) and corresponding gain factors for the two uplink carriers 920, 940, so that the signal-to-interference ratio (SIR) of the E-DPDCH 927, 947 (which contains data bits) is approximately the same on both uplink carriers 920, 940. For instance, if the DPCCH SIR of uplink carrier 1 920 is −22 dB in average while the DPCCH SIR of uplink carrier 2 940 is −19 dB in average, setting a reference gain factor 3 dB lower for uplink carrier 2 (for the same reference E-TFCI) would result in approximately the same E-DPDCH SIR for both uplink carriers 920, 940 and a given E-TFC (the reference gain factor of uplink carrier 2 940 may actually be set slightly lower than 3 dB below uplink carrier 1 920 given the better channel estimate with uplink carrier 2 940).

Synchronization may be defined on a per-carrier basis. The WTRU may apply the synchronization procedure on both carriers separately. The WTRU may be allowed to transmit on a carrier depending on the synchronization status on that carrier. Radio link failure may be declared upon loss of synchronization on both carriers.

Still referring to FIG. 9, embodiments for E-TFC restriction and selection are described hereafter. A WTRU transmission may be restricted by a maximum allowed transmit power. The maximum allowed transmit power of the WTRU may be a minimum of a signaled configured value and a maximum power allowed due to WTRU design limitation. The maximum allowed transmit power of the WTRU may be configured as a total maximum power in a given transmission time interval (TTI) for both uplink carriers 920, 940, or may be carrier-specific. In the latter case, the same maximum power value may be assigned to each uplink carrier 920, 940 or a different maximum power value may be assigned to each uplink carrier 920, 940. This may depend on the particular configuration of the device, (e.g., the number of power amplifiers and antennas of the WTRU), and/or on network control and configuration. The total maximum transmit power and the per-carrier maximum transmit power may be simultaneously configured.

The WTRU behavior and operation may be quite different in both cases (i.e., one total maximum transmit power or independent per-carrier maximum transmit power). Therefore, the WTRU may indicate the power capabilities of the WTRU, (i.e., one maximum power or a maximum power defined per carrier), to the network so that the network knows whether the WTRU has a total maximum power for both uplink carriers 920, 940 or a carrier-specific maximum power for each uplink carrier 920, 940, and may schedule operations and correctly interpret the uplink power headroom reported by the WTRU. If the power requirements are specified in the standards the WTRU may not need to signal these capabilities.

Figure 10:
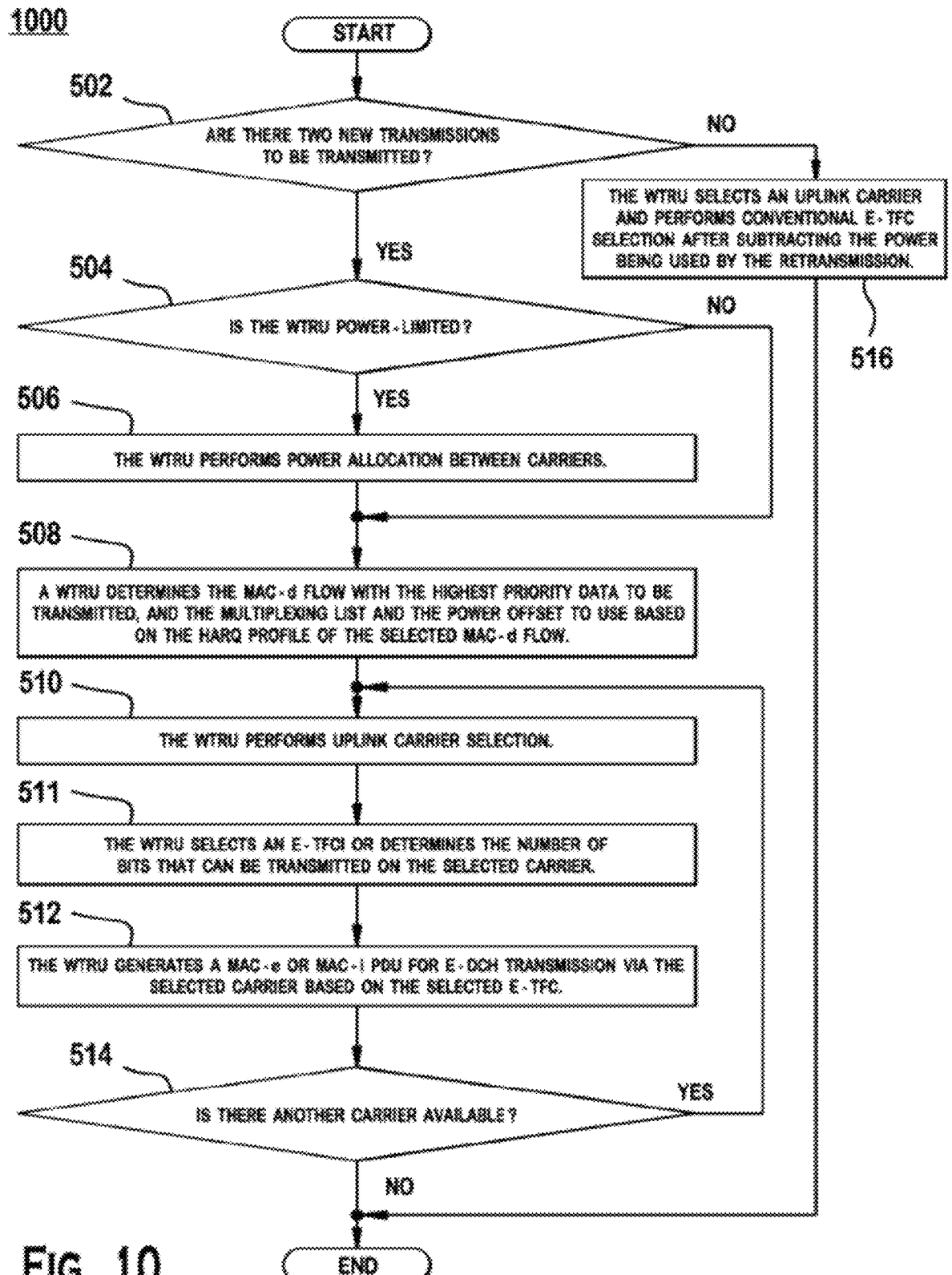
FIG. 10 is a flow diagram of an example process for E-TFC selection and MAC-e or MAC-i PDU generation while utilizing two uplink carriers.

FIG. 10 is a flow diagram of an example process 1000 for E-TFC selection and MAC-i PDU generation while utilizing two uplink carriers is shown. As mentioned above, specific terms for referring to the carriers are used interchangeably herein, but it is noted that in an HSPA+type system, the two carriers may be referred to as an anchor (or primary) carrier and a supplementary (or secondary) carrier and these terms will be used for convenience in describing FIG. 10. A WTRU determines whether there are two (N in general, N being an integer larger than one) new transmissions to be transmitted for the upcoming TTI (step 502). If there is one new transmission for the upcoming TTI, (e.g., there are one new transmission and one retransmission of the previous failed transmission), the WTRU selects an uplink carrier (the carrier for the new transmission) for E-TFC selection and performs an E-TFC selection procedure for the new transmission while the supported E-TFCIs for the new transmission are determined after subtracting the power being used by the retransmission (step 516). If there are two new transmissions to be transmitted, the WTRU determines whether the WTRU is power limited, (i.e., sum of the total power that would be used by the WTRU in each carrier given the grants (scheduled and non-scheduled) and control channels exceed the maximum power allowed by the WTRU, optionally including backoff) (step 504). If not, the process 500 proceeds to step 508. If so, the WTRU performs power allocation between the uplink carriers (step 506). Alternatively, the WTRU may proceed to step 506 for power allocation between the carriers without checking if the WTRU is power limited. Once power allocation is performed the WTRU fills up the transport blocks sequentially one carrier after the other.

The WTRU determines the MAC-d flow with the highest priority data to be transmitted, and the multiplexing list and the power offset to use based on the HARQ profile of the selected MAC-d flow (step 508). When determining the highest priority MAC-d flow the WTRU may, for every carrier, determine the highest priority MAC-d flow configured with data available amongst all MAC-d flows. In an alternate embodiment, the WTRU may, for every carrier for which E-TFC selection or highest priority MAC-d flow selection is being performed, determine the highest priority MAC-d flow amongst all MAC-d flows allowed to be transmitted on the given carrier. The WTRU performs an uplink carrier selection procedure to select an uplink carrier among a plurality of uplink carriers to fill up with data first (step 510). It should be noted that the steps of carrier selection, MAC-d flow determination may not necessarily be performed in the order described, but may be performed in any order). The WTRU selects an E-TFCI or determines the number of bits that can be transmitted on the selected carrier based on a maximum supported payload (i.e., set of supported E-TFCIs), a remaining scheduled grant payload, a remaining non-scheduled grant payload, data availability and logical channel priorities (step 511).

The WTRU generates a MAC-e or MAC-i PDU for E-DCH transmission via the selected carrier based on the selected E-TFC (step 512). If scheduling information (SI) needs to be sent for the selected carrier, the WTRU may initially include the SI on this carrier before including any other data. Once the WTRU has completed the available space on the selected carrier or has exceeded the data in the buffer allowed to be transmitted in the TTI, the WTRU determines whether there is another uplink carrier available and data is still available (step 514). If not, the process 500 ends. If so, the process 500 returns to step 510 (or alternatively to step 508) to select the E-TFCI of the next carrier.

At this point, (in step 508), the WTRU may optionally re-determine the highest priority MAC-d flow that has data to be transmitted. The re-selected highest priority MAC-d flow may be different than the one determined initially before filling up the previously selected carrier. If a new highest MAC-d flow is selected, the WTRU determines the power offset based on the HARQ profile of the newly selected MAC-d flow, and may then determine the maximum supported payload (or set of supported E-TFCs) and remaining scheduled grant payload according to the new power offset. Alternatively, the WTRU may determine the MAC-d flow priority only once at the beginning of the procedure (e.g., step 508) and apply the selected HARQ profile and multiplexing list to both carriers. This implies that the WTRU determines the maximum supported payload (or supported E-TFCs and remaining scheduled payload) for both carriers either simultaneously in parallel or only at the time these values are needed according to E-TFC selection sequence. In this case for the second selected carrier the WTRU may return to step 510. It should be noted that the process 500 is applicable to the case that more than two uplink carriers are utilized.

Details of the power allocation, carrier selection, and E-TFC restriction and selection will be explained below.

The maximum supported payload refers to the maximum allowed number of bits that may be transmitted based on the available power for any uplink carrier. This, as an example, may also be referred to as the maximum supported E-TFCI. The maximum supported payload or the set of supported or blocked E-TFCIs, for example in HSPA systems are determined as part of the E-TFC restriction procedure and may be dependent on the selected HARQ offset. Additionally, the set of supported E-TFCI may also be dependent on the minimum set E-TFCI. Embodiments for E-TFC restriction and determination of supported/blocked E-TFCI are described below.

Where referred to hereafter, a MAC-d flow may also refer to a logical channel, a group of logical channels, a data flow, a data stream, or data service or any MAC flow, application flow, etc. All the concepts described herein are equally applicable to other data flows. For example in HSPA system for E-DCH, each MAC-d flow is associated to a logical channel (e.g., there is a one-to-one mapping) and has a priority from 1 to 8 associated to it.

Generally, there are scheduling mechanisms used for uplink transmissions and data transmissions. The scheduling mechanisms may be defined by the quality of service (QoS) requirements and/or the priority of the data streams to be transmitted. Depending of QoS and/or priority of the data streams, some of the data streams may or may not be allowed to be multiplexed and transmitted together in one TTI. Generally, data flows and streams can be grouped in best effort or non real time services and guaranteed bit rate service with some strict delay requirements. In order to meet QoS requirements different scheduling mechanisms are used, some dynamic in nature and some less dynamic.

Generally, wireless systems, such as LTE and high speed uplink packet access (HSUPA), operate on a request-grant basis where WTRUs request a permission to send data, via uplink feedback, and the Node-B (eNB) scheduler and/or RNC decides when and how many WTRUs will be allowed to do so. Hereafter, this is referred to as scheduled mode transmissions. For example in HSPA systems, a request for transmission includes indication of the amount of buffered data in the WTRU and WTRU's available power margin (i.e., UE power headroom (UPH)). The power that may be used for the scheduled transmissions is controlled dynamically by the Node-B through absolute grant and relative grant.

For some data streams with strict delay requirements and guaranteed bit rate, such as voice over IP (VoIP) or signaling radio bearers or any other service that need to meet these requirements, the network may ensure the timely delivery of such transmissions via special scheduling mechanisms that are less dynamic in nature and allow the WTRUs to transmit data from a particular flow on at pre-scheduled time periods, resources, and up to a configured data rate. These flows in some systems such as HSPA for example are referred to as non-scheduled flows. In other systems, such as LTE. they may be referred to as semi-persistent scheduling and flows. Even though the embodiments described herein are described in terms of scheduled and non-scheduled data, it should be understood that they are equally applicable to other systems that use similar scheduling procedure and distinctions between data flows.

Dynamic scheduling, where control channels are used to allocate the resources for certain transmissions and for the possible retransmissions, gives full flexibility for optimizing resource allocation. However, it requires control channel capacity. In order to avoid control channel limitation problem, semi-persistent scheduling (SPS) may be used in systems such as LTE and non-scheduled transmission in systems such as UMTS. Flows that use dynamic scheduling or the dynamic grant-based mechanism (e.g., via physical channel control signaling) will be referred to as scheduled transmissions. Data streams that use a more semi-static and periodic allocation of resources will be referred to as non-scheduled transmissions.

For example, in HSPA, each MAC-d flow is configured to use either scheduled or non-scheduled modes of transmissions, and the WTRU adjusts the data rate for scheduled and non-scheduled flows independently. The maximum data rate of each non-scheduled flow is configured by higher layers, and typically not changed frequently.

In the E-TFC selection procedure, the WTRU may also determine the remaining non-scheduled grant payload for each MAC-d flow with a non-scheduled grant, which refers to and correspond to the number of bits allowed to be transmitted according to the configured non-scheduled grant for the given MAC-d flow.

The remaining scheduled grant payload in the procedure above refers to the highest payload that could be transmitted according to the network allocated resources after power allocation for other channels. For example, a network allocated resource refers to the serving grant and selected power offset of the corresponding carrier for HSPA systems. The value of the serving grant used for calculating the remaining scheduled grant payloads for the uplink carriers may be based on the value of the actual serving grant allocated for the uplink carriers. Alternatively, as the remaining scheduled grant payload for the primary carrier and/or the secondary carrier may be based on the scaled or fictitious or virtual grant after power allocation is performed, the WTRU may use the "virtual" or "fictitious" or scaled serving grant to determine the remaining scheduled grant payload. The three terms may be used interchangeably and refer to the power allocation or power split for scheduled transmissions for each carrier. The scaling of the grants is described as part of the power allocation schemes below. Alternatively, if the WTRU is sharing one serving grant for both uplink carriers, (i.e., one serving grant is given for both uplink carriers), the WTRU may use half the serving grant for each uplink carrier. Alternatively, the WTRU may assume that all serving grant is being allocated to one uplink carrier when performing this calculation.

The non-scheduled grant may be carrier specific, (e.g., the configured non-scheduled grant value is assigned and configured for only one carrier, the carrier for which non-scheduled transmission is allowed). The carrier in which non-scheduled transmission is configured/allowed may be predetermined, (e.g., the non-scheduled transmission may be allowed only on the primary carrier or alternatively on the secondary carrier). Alternatively, it may be configured by the network dynamically. The value of non-scheduled grant may be carrier independent, in which case a total number is determined for both carriers.

Data flows may be configured to be carrier specific (e.g., network configures a flow and an associated carrier over which this flow may be transmitted). If data flows are carrier specific the WTRU may perform the E-TFC selection procedure independently for each carrier. The network may provide a non-scheduled grant based on a HARQ process that belongs to a carrier, or provide a non-scheduled grant that is applicable to a TTI, and the WTRU chooses a carrier.

Embodiments for selecting an uplink carrier for initial E-TFC selection are disclosed hereafter. The embodiments for carrier selection described below may be performed individually or in combination with any other embodiments disclosed herein. The procedures affecting the choice of the number of bits to be transmitted in each uplink carrier and the power to use in each uplink carrier, and the like are all dependent on which uplink carrier the WTRU selects and treats first.

In accordance with one embodiment, a WTRU may give priority to, and treat first, the anchor carrier. This may be desirable if non-scheduled transmissions are allowed on the anchor carrier. Alternatively, the secondary carrier may be given a priority and selected first.

Alternatively, the WTRU may determine the highest priority carrier to minimize inter-cell interference, maximize WTRU battery life, and/or provide the most efficient energy per bit transmission. More specifically, the WTRU may choose the uplink carrier that has the largest calculated carrier power headroom. The WTRU may base this determination on the current power headroom, (e.g., UE power headroom (UPH)) measurement for each carrier (UPH indicates the ratio of the maximum WTRU transmission power and the corresponding DPCCH code power) or on the results of the E-TFC restriction procedure, (e.g., normalized remaining power margin (NRPM) calculation for each carrier, or remaining power), which equivalently translates to the carrier with the lowest DPCCH power ($P_{DPCCH}$). For instance, the uplink carrier selection may be made in terms of the number of bits, (e.g., a priority may be given to the carrier which provides a greater "maximum supported payload" between the anchor carrier and the supplementary carrier). The maximum supported payload is the payload determined based on the remaining power (e.g., NRPM or other value disclosed below) of the WTRU.

Alternatively, the WTRU may give a priority to the uplink carrier which provides the WTRU with the largest available grant, which allows the WTRU to send the highest amount of data and possibly create the least number of PDUs and thus increase efficiency and reduce overhead. The WTRU may select a carrier based on the maximum value between the serving grant for the anchor carrier (SGa) and serving grant for the supplementary carrier (SGs).

Alternatively, the WTRU may provide a priority to the carrier that provides the greater "remaining scheduled grant payload" between the anchor carrier and the supplementary carrier. The remaining scheduled grant payload is the available payload determined based on the scheduling grant from the network and remaining after processing of the DCH and HS-DPCCH.

Alternatively, the WTRU may optimize between maximum power and maximum grant. More specifically, the WTRU may select a carrier that allows the highest number of bits to be transmitted. The WTRU determines the number of bits that may be transmitted for anchor carrier and supplementary carrier limited by both power and grant, (i.e., "available payload" for the anchor carrier and "available payload" for the supplementary carrier), and may select the carrier that provides the highest available payload. The available payload may be determined as a minimum between the remaining scheduled grant payload and the maximum supported payload.

Optionally, the sum of "remaining non-scheduled payload" for each MAC-d flow that may be multiplexed (or all non-scheduled MAC-d flows that may have data available) may also be taken into account when calculating the available payload. More specifically, the available payload may be determined as a minimum of (remaining scheduled grant payload+SUM (remaining non-scheduled payloads for all allowed non-scheduled flows)) and the maximum supported payload. If non-scheduled flows are allowed in one carrier only, (e.g., in the anchor carrier only), the available payload for the anchor carrier is considered.

If the non-scheduled grants are provided on a per carrier basis or if the non-scheduled transmissions are allowed on one carrier, the WTRU may give priority to the carrier that contains the highest priority non-scheduled MAC-d flow to be transmitted in that TTI or allows a non-scheduled MAC-d flow. For instance, if the non-scheduled transmissions are allowed on the primary carrier only and for the given HARQ process the WTRU is configured with non-scheduled data and data is available, the WTRU may give priority to the primary carrier (i.e., fill the primary carrier first). If in a given TTI the highest priority MAC-d flow does not correspond to a non-scheduled flow, but a non-scheduled flow is allowed to be multiplexed with the selected highest priority MAC-d flow, the WTRU may still give priority to the carrier which allows non-scheduled transmissions. Therefore, if any non-scheduled flows are allowed to be transmitted in a current TTI and non-scheduled data is available, the WTRU may first fill up the carrier which allows transmission of the non-scheduled flows. The WTRU fills up the selected carrier with non-scheduled and scheduled data up to the available power and/or grant according to the configured logical channel priority. The remaining carrier(s) is then filled up if data, power and grant are available for that carrier.

Alternatively, the WTRU may base its decision to select a carrier on one or a combination of CPICH measurement and HARQ error rates on each carrier, etc.

Example embodiments for E-TFC selection for independent maximum power limitation are explained hereafter. The WTRU may have a different transmission powers and maximum allowed power for each carrier, which may depend on the particular device configuration or design. This depends on implementation design, (e.g., a WTRU may be designed with two different power amplifiers and two different antennas), and/or on network control and configuration. It is also applicable if the WTRU pre-allocates the power between the carriers, or allocates the power in parallel, as described below. In these situations, the maximum power or available power that may be used by each carrier corresponds to the allocated power per carrier. The embodiments are also applicable to the case where power is shared between the carriers but the power is allocated or scaled between the carriers prior to filling up the carriers.

Where the powers are pre-allocated or the maximum amount of power is independent on each carrier, the MAC PDUs may have to be filled up sequentially due to the fact that the delivery order of RLC PDUs has to be maintained in order to allow proper operation of higher layers. Additionally, the WTRU may be buffer limited in which case enough data to transmit over one carrier may be available.

In this situation, the WTRU may initially choose the highest priority carrier P1 based on one of the embodiments described above. For instance, the WTRU may select the carrier with the higher power headroom, equivalently the carrier with the lower DPCCH power to be filled up with data first or the primary or secondary carrier may be filled up first. This allows, even a buffer limited WTRU to transmit most of its data, or its highest priority data, over the carrier with the best channel quality or over the carrier that allows transmission of the highest priority data, such as non-scheduled transmissions.

According to the highest priority MAC-d flow, associated HARQ profile and multiplexing list, the WTRU then fills up the available space on the transport block of carrier p1 (i.e., creates MAC-e or MAC-i to be sent on carrier p1), according to the "Maximum Supported Payload p1", "Remaining Scheduled Grant Payload p1", and remaining non-scheduled grant payload, if allowed and configured in the selected carrier, P1. As previously mentioned, this corresponds to the number of bits that may be transmitted according to the allowed power, allowed scheduled grant, and allowed non-serving grant, respectively. In this situation, allowed power and allowed grant may correspond to scaled values of the power and/or grant of each carrier or the configured powers or grants. This may be done if the power or grant is proportionally split between the two carriers or allocated in parallel. If SI needs to be sent, the WTRU may send it in carrier p1, or alternatively send it in the carrier in which the SI is configured to be transmitted.

Once the WTRU has completed the available space on carrier p1, it then fills up next carrier. At this point the WTRU may re-determine the highest priority MAC-d flow that has data to be transmitted and is allowed in the carrier being treated. At this point the highest priority MAC-d flow may be different than the one determined initially, prior to carrier p1 being filled up.

When determining the highest priority MAC-d flow the WTRU may, for every carrier, determine the highest priority MAC-d flow configured with data available amongst all MAC-d flows. In an alternate embodiment, the WTRU may, for every carrier for which E-TFC selection or highest priority MAC-d flow selection is being performed, determine the highest priority MAC-d flow amongst all MAC-d flows allowed to be transmitted on the given carrier.

If the carrier for which E-TFC selection is being performed does not allow a certain type of MAC-d flow, when determining the highest priority MAC-d flow the WTRU may not consider the MAC-d flows that are not allowed for transmission on the given carrier. For instance, if the WTRU is performing E-TFC selection for the second carrier, it may not include non-scheduled MAC-d flows in the selection of highest priority MAC-d flow. So if a non-scheduled MAC-d flow has data available and has the highest configured MAC-d priority the WTRU may not use this MAC-d flow as its highest priority MAC-d flow and may not use the HARQ profile, power offset and HARQ retransmission, and multiplexing list for the TTI for the carrier. For specific example, for HSPA dual carrier UL when treating the second carrier the WTRU may determine the highest priority MAC-d flow amongst all scheduled MAC-d flows.

Once the highest MAC-d flow is determined, the WTRU determines the new allowed MAC-d flows that may be multiplexed in this TTI, and the power offset based on the HARQ profile of the selected MAC-d flow to be used for the new carrier. The WTRU may then determine the Maximum Supported Payload and Remaining Scheduled Grant Payload according to the new power offset and fill up the carrier with data if available accordingly.

Alternatively, the WTRU may determine the Maximum Supported Payload and Remaining Scheduled payload for both carriers at the beginning of the E-TFC selection procedure or prior to filling up the carrier, which implies that the WTRU can use the same power offset for both carriers regardless of whether data from that first highest selected MAC-d flow is being transmitted on both carriers. In this case, the multiplexing list will remain the same on both carriers and may be a limiting factor when not enough data is available from those logical channels, but the WTRU has more power and grant available for transmission of other logical channels.

Once carrier p1 (which may be determined as above and filled up sequentially) is filled up with data, the WTRU immediately moves to the other carrier and continues to fill it up with data.

Alternatively, the carriers may be filled up in parallel, which implies that the data from all the allowed logical channels is split between the two carriers. In order to avoid out-of-order delivery, the data or the RLC buffer has to be split. For instance, if 10 RLC PDUs with SN 0 to 9 are available, RLC PDUs 0 to 4 are sent to carrier one and 5 to 9 are sent to carrier two. The WTRU then moves to the next logical channel if space still remains and the buffer is again split in the same way.

Alternatively, the E-TFC and carrier filling may be performed in parallel, but each carrier takes data from different logical channels. This implies that the WTRU selects the two highest priority MAC-d flows, determines the HARQ profile for each and the multiplexing list for each and maps them to the two individual carriers. This will allow the WTRU to fill up and perform E-TFC in parallel without risking out-of-order RLC delivery. However, this may result in situations where data from the highest logical channel is still available but the WTRU may no longer send them, since the carrier is full.

In another embodiment, data flows may be carrier specific. In this case the WTRU may perform the E-TFC selection procedure independently for each carrier.

Example embodiments for E-TFC selection for total combined maximum power limitation are described hereafter. Some of the aspects of these embodiments may also be applicable as described above if the power between the two carriers is allocated in parallel or some form of dynamic power allocation is performed.

In a sequential approach, when the WTRU maximum power is shared amongst both carriers, the WTRU may initially select the highest priority carrier (P1) using one of the embodiments described above. E-TFC restriction and selection may still be performed sequentially, wherein the available power and grant used are equivalent to the allocated or scaled power or grant.

Once the WTRU has selected the highest priority carrier, the WTRU performs the E-TFC selection and restriction procedure, where the highest priority MAC-d flow is selected and the power offset, the Maximum Supported payload p1 is determined, the Scheduled Available Payload is selected according to the serving grant of carrier P1 and the non-scheduled available payload is selected. If SI needs to be transmitted, it may be treated with the first selected carrier or alternatively it may be treated on the carrier in which it is allowed to be transmitted. In this case, the WTRU may perform a sequential E-TFC restriction procedure as described above, where the WTRU assumes all the power is available to be used by carrier P1 and assuming that no data is being transmitted on the secondary carrier. The WTRU creates a MAC-e or MAC-i PDU to be transmitted on this carrier according to the E-TFC selection. Alternatively, if the SI is sent in one carrier only (i.e., the anchor carrier only), then the E-TFC selection takes it into account when performing E-TFC for the carrier in which the SI is being sent.

The maximum supported payload, (i.e., E-TFC restriction), for the selected carrier may be determined, for example, according to the NRPM calculation. In the case where the WTRU has a retransmission in carrier x, then no E-TFC selection is performed for carrier x. The WTRU performs E-TFC selection and creates a MAC-i or MAC-e PDU for the carrier y, the remaining carrier.

The WTRU then has to create a MAC-e or MAC-i PDU for the remaining carrier. At this point the WTRU may re-determine (or determine for the first time if a retransmission is ongoing on carrier x) the highest priority MAC-d flow that has data to be transmitted and the power offset based on the HARQ profile of the selected MAC-d flow and the MAC-d flow multiplexing list. Alternatively, the WTRU uses the same power offset determined initially in the procedure.

The WTRU then performs the E-TFC restriction procedure for this second carrier. The WTRU may take into account the power that will be used from the first carrier and the remaining available power is used when calculating the maximum supported payload or when determining the set of supported E-TFCIs. Alternatively, the WTRU may subtract a "backoff power" (i.e., the particular power losses experienced when the WTRU transmits on two carriers in the same TTI), prior to performing the E-TFC restriction on the second carrier, (i.e., the second selected carrier), when two new transmissions take place or when one new transmission is taking place due to a HARQ retransmission in the other carrier.

In these embodiments described herein, the WTRU may be configured to not to transmit a DPCCH when it is determined that data does not need to be sent. The WTRU may also be configured to not transmit any data on a second carrier if it does not have enough power where the maximum power is allocated per carrier. For instance, if one of the carriers does not have enough power, the WTRU may use one carrier to transmit (the one that has the highest UPH or highest NRPM), instead of using the minimum set E-TFCI, or alternatively, the WTRU may not transmit in one of the carriers if both do not have enough power. The WTRU may use the minimum set on one of the carriers and may not transmit on the second.

The MAC-i or MAC-e PDU is then filled up according to the determined maximum supported payload, the scheduled available payload (according to the serving grant of this carrier), and the non-scheduled available payload, if applicable.

In another embodiment, the WTRU may select the E-TFC on each carrier in such a way that the transmission power (over all UL channels, i.e., DPCCH, E-DPCCH, HS-DPCCH, E-DPDCH) on each carrier is the same or the difference between the two is less than a pre-configured maximum value. This may be achieved, for instance, by calculating for a given transmission power level which E-TFCs may be transmitted on each carrier given the transmission power of the DPCCH and other channels on each carrier. For instance, assuming that the DPCCH power levels are 7 dBm and 10 dBm on, say, carriers 1 and 2 respectively, and that the power levels of the HS-DPCCH and E-DPCCH are each −3 dB below that of the DPCCH, if the transmission power level on each carrier is 18 dBm, the power headrooms on each carrier are 8 dB and 5 dB respectively, and the corresponding E-TFC sizes may be 600 bits and 300 bits. Thus the WTRU may transmit with equal power (of 18 dBm) on both carriers by selecting an E-TFC of 600 bits on the carrier 1 and an E-TFC of 300 bits on carrier 2.

This principle may be applied in different cases. If the WTRU transmission is limited by the maximum UL power, the WTRU may select the E-TFC on each carrier by splitting the maximum UL power equally between the two carriers (thus the UL power available to each carrier would be 3 dB below the maximum) and determining the maximum supported E-TFC on each carrier using the method disclosed above. If the WTRU transmission is limited by the amount of data in the WTRU buffer, the WTRU may seek the transmission power level of both carriers such that the amount of data that may be transmitted with the resulting E-TFCs on each carrier corresponds to the amount of data in the buffer.

In another embodiment, the WTRU may select the E-TFC on each carrier in such a way that the interference load incurred on each carrier is same or approximately the same. The interference load incurred on a carrier may, for instance, be estimated as the power ratio between the E-DPDCH power and the DPCCH power, which corresponds to the power ratio used for scheduling. Thus, provided that the scheduling grant and the power headroom is sufficient on both carriers, the WTRU selects the E-TFC on each carrier by determining how many bytes may be transmitted from the WTRU buffer, based on grant and by determining the needed E-TFC size on each carrier by dividing this number of bytes by 2 and applying the appropriate MAC headers.

This method would result equal power ratios on each carrier provided that mapping between reference power ratios and reference E-TFCs is the same between the carriers, and provided that all the data belong to logical channels that have the same HARQ offset. In case where the data belongs to logical channels that do not all have the same HARQ offset, the WTRU has to find which sharing of bytes that result in the same power ratio for both E-TFCs.

Embodiments for dual-carrier power back-off and maximum power reduction for multicarrier operations are disclosed hereafter. To relieve the WTRU power amplifier design and power consumption, the WTRU is typically allowed a certain maximum power reduction (MPR). This power reduction margin allows a WTRU implementation to reduce the maximum transmission power (this is also referred to as power back-off) to avoid causing unintended adjacent carrier interference due to power amplifier non-linearity.

In accordance with one embodiment, a power back-off may be applied when transmitting on two uplink carriers rather than one. The WTRU determines the amount of data to be transmitted on both carriers according to any of the embodiments described herein, and may apply a power back-off (i.e., reduction in total transmission power or per-carrier transmission power) if data is to be sent on two carriers. The application of a power back-off would then result in the use of a smaller E-TFCI on each carrier. The WTRU may determine whether more data may be sent using a single carrier without power back-off or using two carriers with power back-off, and select the option allowing for transmission of most total number of bits.

The scheduling information (SI) may be modified such that it provides the UL power headroom measurement for each carrier individually. More specifically, the format of the SI may be expanded to include UPH for the supplementary carrier, as shown in FIG. 11, where UPH1 and UPH2, correspond to the ratio of the maximum WTRU transmission power and the corresponding anchor and supplementary DPCCH code power, respectively.

Alternatively, the WTRU may report one UPH measurement, and the Node-B may infer the UPH of the other carrier based on the noise rise difference between the carriers.

Alternatively, a single UPH may be calculated and reported as:

$$UPH = P_{max,tx}/(P_{DPCCH1} + P_{DPCCH2}), \quad \text{Equation (1)}$$

where $P_{max,tx}$ is the total maximum output power that may be transmitted by the WTRU and $P_{DPCCH1}$ and $P_{DPCCH2}$ represent the transmitted code power on DPCCH of carrier 1 and carrier 2, respectively. In the case where per-carrier maximum transmission powers are configured, then $P_{max,tx}$ represents the sum of the per-carrier maximum transmission powers.

Alternatively, the scheduling information format remains unchanged, but the WTRU may report the SI individually in each carrier. For instance, if the SI is sent over the anchor carrier it reports the UPH of the anchor carrier, and if it sent over the supplementary carrier it reports the UPH of the supplementary carrier.

Figure 12:
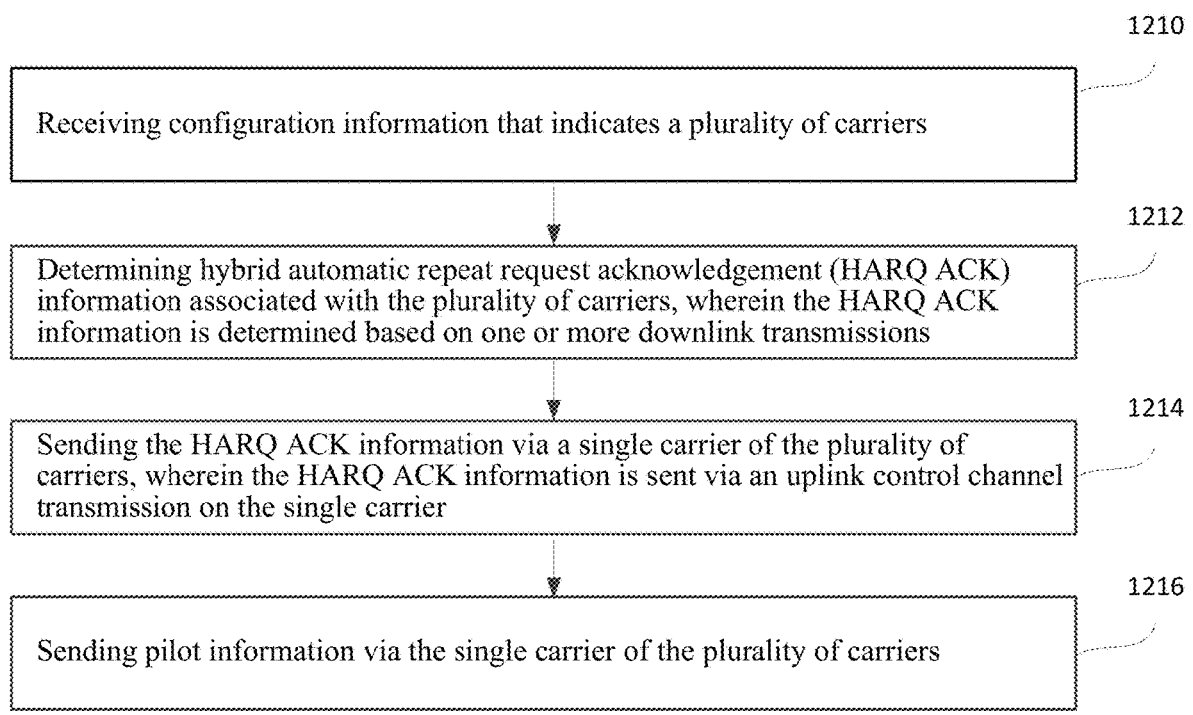
FIG. 12 shows an example performed by a WTRU.

FIG. 12 shows an example performed by a WTRU including 1210, 1212, 1214 and 1216.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU), comprising:
    a receiver;
    a transmitter; and
    a processor configured to:
        receive, via the receiver, configuration information that indicates a plurality of carriers;
        determine hybrid automatic repeat request acknowledgement (HARQ ACK) information associated with the plurality of carriers, wherein the HARQ ACK information is determined based on one or more downlink transmissions;
        send, via the transmitter, the HARQ ACK information via a single carrier of the plurality of carriers, wherein the HARQ ACK information is sent via an uplink control channel transmission on the single carrier; and
        send, via the transmitter, pilot information via the single carrier of the plurality of carriers.

2. The WTRU of claim 1, wherein the plurality of carriers comprises a primary carrier, and the single carrier of the plurality of carriers is the primary carrier.

3. The WTRU of claim 2, wherein the plurality of carriers comprises a secondary carrier.

4. The WTRU of claim 1, wherein the processor is configured to send data via a first carrier of the plurality of the carriers.

5. The WTRU of claim 4, wherein the processor is configured to send another data via a second carrier of the plurality of the carriers.

6. The WTRU of claim 1, wherein the plurality of carriers comprises a plurality of uplink carriers and comprises a plurality of downlink carriers, wherein each uplink carrier of the plurality of uplink carriers is paired with a respective downlink carrier of the plurality of downlink carriers.

7. The WTRU of claim 1, wherein the processor is configured to:
    determine each HARQ ACK information associated with a respective carrier of the plurality of carriers; and
    send each HARQ ACK information associated with the respective carrier of the plurality of carriers via the single carrier of the plurality of carriers.

8. A method performed by a wireless transmit/receive unit (WTRU), comprising:
    the WTRU receiving configuration information that indicates a plurality of carriers;
    the WTRU determining hybrid automatic repeat request acknowledgement (HARQ ACK) information associated with a first carrier of the plurality of carriers, wherein the HARQ ACK information is determined based on one or more downlink transmissions;
    the WTRU sending the first HARQ ACK information via a single carrier of the plurality of carriers, wherein the HARQ ACK information is sent via an uplink control channel transmission on the single carrier; and
    the WTRU sending pilot information via the single carrier of the plurality of carriers.

9. The method of claim 8, wherein the plurality of carriers comprises a primary carrier, and the single carrier of the plurality of carriers is the primary carrier.

10. The method of claim 9, wherein the plurality of carriers comprises a secondary carrier.

11. The method of claim 8, further comprising sending data via a first carrier of the plurality of the carriers.

12. The method of claim 11, further comprising sending another data via a second carrier of the plurality of the carriers.

13. The method of claim 8, wherein the plurality of carriers comprises a plurality of uplink carriers and comprises a plurality of downlink carriers, wherein each uplink carrier of the plurality of uplink carriers is paired with a respective downlink carrier of the plurality of downlink carriers.

14. The method of claim 8, further comprising:
    determining each HARQ ACK information associated with a respective carrier of the plurality of carriers; and
    sending each HARQ ACK information associated with the respective carrier of the plurality of carriers via the single carrier of the plurality of carriers.

* * * * *